United States Patent
Wang et al.

(10) Patent No.: US 9,195,480 B2
(45) Date of Patent: Nov. 24, 2015

(54) ASSOCIATED PLUG-IN MANAGEMENT METHOD, DEVICE AND SYSTEM

(71) Applicant: Huawei Technologies Co., Ltd., Shenzhen, Guangdong (CN)

(72) Inventors: Qian Wang, Shenzhen (CN); Zhifeng LI, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/522,385

(22) Filed: Oct. 23, 2014

(65) Prior Publication Data

US 2015/0052509 A1    Feb. 19, 2015

Related U.S. Application Data

(63) Continuation of application No. PCT/CN2013/080571, filed on Jul. 31, 2013.

(51) Int. Cl.
*G06F 9/45* (2006.01)
*G06F 9/44* (2006.01)
*G06F 9/445* (2006.01)

(52) U.S. Cl.
CPC .................. *G06F 9/44526* (2013.01)

(58) Field of Classification Search
None
See application file for complete search history.

(56) References Cited

U.S. PATENT DOCUMENTS

| | | | |
|---|---|---|---|
| 6,493,871 B1 * | 12/2002 | McGuire | G06F 8/65 717/178 |
| 6,871,345 B1 * | 3/2005 | Crow | G06F 8/67 717/120 |
| 7,069,553 B2 | 6/2006 | Narayanaswamy et al. | |
| 7,146,609 B2 * | 12/2006 | Thurston | G06F 8/65 717/175 |
| 7,181,731 B2 * | 2/2007 | Pace et al. | 717/136 |
| 7,254,814 B1 * | 8/2007 | Cormier | G06F 9/44526 717/120 |

(Continued)

FOREIGN PATENT DOCUMENTS

| | | |
|---|---|---|
| CN | 1920775 A | 2/2007 |
| CN | 1976301 A | 6/2007 |
| CN | 101387956 A | 3/2009 |

OTHER PUBLICATIONS

Soroker, et al., "Pegboard A Framework for Developing Mobile Application", 2006 ACM; [retrieved on Aug. 21, 2015]; Retrieved from Internet <URL:http://dl.acm.org/citation.cfm?id=1134680.1134695>;pp. 138-150.*

(Continued)

*Primary Examiner* — Xi D Chen
(74) *Attorney, Agent, or Firm* — Leydig, Voit & Mayer, Ltd.

(57) ABSTRACT

An associated plug-in management method, device, and system are provided. A first associated plug-in and a second component that uses the first associated plug-in are determined by obtaining description information of the first associated plug-in and information about the second component that uses the associated plug-in, where the description information of the first associated plug-in and the information about the second component are provided by a first component; and then, based on the information about the second component and the description information of the first associated plug-in, the first associated plug-in is installed onto a device on which the second component is located. Thus decoupling during deployment of components related to an associated plug-in is implemented.

29 Claims, 12 Drawing Sheets

(56) References Cited

U.S. PATENT DOCUMENTS

| | | | | |
|---|---|---|---|---|
| 7,412,686 | B2* | 8/2008 | Guthrie | G06F 8/20 717/178 |
| 7,469,402 | B2* | 12/2008 | Bender | G06F 8/20 717/120 |
| 7,493,614 | B2* | 2/2009 | Liu | G06F 9/44526 717/175 |
| 7,584,471 | B2* | 9/2009 | Bjare | G06F 9/44526 717/178 |
| 7,617,224 | B2* | 11/2009 | Moulckers | G06F 8/71 717/120 |
| 7,698,685 | B2* | 4/2010 | Pepin | G06F 9/44526 717/120 |
| 7,788,350 | B2* | 8/2010 | Ferri | G06F 8/60 717/178 |
| 7,814,470 | B2* | 10/2010 | Mamou et al. | 717/162 |
| 7,861,243 | B2* | 12/2010 | Narayanaswamy et al. | 717/177 |
| 7,987,444 | B2* | 7/2011 | Fuller et al. | 717/105 |
| 8,527,985 | B2* | 9/2013 | Srinivasamoorthy et al. | 717/177 |
| 8,561,048 | B2* | 10/2013 | Seeger et al. | 717/168 |
| 8,667,605 | B2* | 3/2014 | Biswas | G06F 21/10 717/175 |
| 8,677,309 | B2* | 3/2014 | Xie et al. | 717/101 |
| 8,683,461 | B2* | 3/2014 | Ladic | G06F 8/60 717/175 |
| 8,726,267 | B2* | 5/2014 | Li et al. | 717/173 |
| 8,849,987 | B2* | 9/2014 | Berg et al. | 709/224 |
| 8,850,423 | B2* | 9/2014 | Barkie et al. | 717/176 |
| 8,930,941 | B2* | 1/2015 | Vorthmann et al. | 717/177 |
| 2001/0044857 | A1* | 11/2001 | Pham et al. | 709/327 |
| 2004/0128669 | A1* | 7/2004 | Furst | G06Q 10/0875 717/178 |
| 2004/0177352 | A1* | 9/2004 | Narayanaswamy | G08F 8/61 717/175 |
| 2004/0221017 | A1 | 11/2004 | Yoon | |
| 2007/0033588 | A1* | 2/2007 | Landsman | 717/178 |
| 2007/0089110 | A1* | 4/2007 | Li | 717/178 |
| 2007/0226678 | A1* | 9/2007 | Li et al. | 717/101 |
| 2007/0226709 | A1* | 9/2007 | Coker et al. | 717/140 |
| 2009/0044183 | A1* | 2/2009 | Quin et al. | 717/169 |
| 2009/0077546 | A1 | 3/2009 | Huang et al. | |
| 2009/0265239 | A1* | 10/2009 | Leacy | 705/14.14 |
| 2010/0125839 | A1* | 5/2010 | Gebis et al. | 717/170 |
| 2010/0312879 | A1 | 12/2010 | Taieb | |
| 2011/0126192 | A1* | 5/2011 | Frost et al. | 717/178 |
| 2011/0202909 | A1* | 8/2011 | Meijer et al. | 717/151 |
| 2012/0117127 | A1* | 5/2012 | MacDonald | 707/822 |
| 2013/0151835 | A1* | 6/2013 | Fontignie et al. | 713/2 |
| 2014/0059530 | A1* | 2/2014 | Banavalikar et al. | 717/170 |

OTHER PUBLICATIONS

Rideau, et al., "Evolving ASDF: More Cooperation, Less Coordination", 2010 ACM; [retrieved on Aug. 21, 2015]; Retrieved from Internet <URL:http://dl.acm.org/citation.cfm?id=1869643.1869648>;pp. 29-42.*

Oberhauser, "An Approach to Flexible Application Composition in a Diverse Software Landscape", 2004 Springer; [retrieved on Aug. 21, 2015]; Retrieved from Internet <URL:http://link.springer.com/chapter/10.1007/978-3-540-30190-5_4>;pp. 48-62.*

Maalej, et al., "Can Development Work Describe Itself?"; 2010 IEEE; [retrieved on Aug. 21, 2015]; Retrieved from Internet <URL:http://ieeexplore.ieee.org/stamp/stamp.jsp?tp=&arnumber=5463344>;pp. 191-200.*

* cited by examiner

ASSOCIATED PLUG-IN MANAGEMENT METHOD, DEVICE AND SYSTEM

CROSS-REFERENCE TO RELATED APPLICATIONS

This application is a continuation of International Application No. PCT/CN2013/080571, filed on Jul. 31, 2013, which is hereby incorporated by reference in its entirety.

TECHNICAL FIELD

Embodiments of the present invention relate to software technologies, and in particular, to an associated plug-in management method, device and system.

BACKGROUND

An application is software that provides a service, and a component is a part that provides a specific function in the application, and generally may be installed selectively. An associated plug-in is a functional module developed by a component through an extended interface defined by another component. The component that develops the associated plug-in is called a provider of the associated plug-in, and the another component that provides the extended interface is called a user of the associated plug-in. Generally, a strict version matching relationship exists between the associated plug-in, the provider of the associated plug-in, and the user of the associated plug-in, and cannot be used arbitrarily, and processing such as installation, upgrade and deletion is required for the associated plug-in according to installation, upgrade and deletion of the component.

In the prior art, no matter whether an associated plug-in is deployed manually or automatically, deployment of the associated plug-in depends on a deployment sequence of related components. Especially, in a situation in which a plurality of applications is integrated, close coupling is required between the related components.

SUMMARY

Embodiments of the present invention provide an associated plug-in management method, device and system, to implement decoupling of components related to an associated plug-in during deployment.

A first aspect of the present invention provides an associated plug-in management method, including:

obtaining, by an associated plug-in management server device, information about a first associated plug-in by using an associated plug-in agent device, where the information about the first associated plug-in includes description information of the first associated plug-in and information about a second component that uses the first associated plug-in, and the first associated plug-in is provided by a first component; and after determining, according to the information about the second component, that installation of the second component is complete, installing, by the associated plug-in management server device according to the information about the second component and the description information of the first associated plug-in, the first associated plug-in onto a device on which the second component is located.

With reference to the first aspect, in a first possible implementation manner of the first aspect, the first associated plug-in is stored in a local associated plug-in warehouse on the associated plug-in agent device; and the method further includes:

performing, by the associated plug-in management server device, synchronization on a central associated plug-in warehouse on the associated plug-in management server device and the local associated plug-in warehouse on the associated plug-in agent device, so that the first associated plug-in is synchronized into the central associated plug-in warehouse on the associated plug-in management server device.

With reference to the first possible implementation manner of the first aspect, in a second possible implementation manner of the first aspect, the installing, by the associated plug-in management server device according to the information about the second component and the description information of the first associated plug-in, the first associated plug-in onto a device on which the second component is located includes:

polling, by the associated plug-in management server device, the central associated plug-in warehouse on the associated plug-in management server device, and when it is discovered that the first associated plug-in is added to the central associated plug-in warehouse on the associated plug-in management server device, installing, according to the information about the second component and the description information of the first associated plug-in, the first associated plug-in onto the device on which the second component is located.

With reference to the second possible implementation manner of the first aspect, in a third possible implementation manner of the first aspect, the method further includes:

performing, by the associated plug-in management server device, change processing on the first associated plug-in according to the information about the second component and change information of the first associated plug-in when the first associated plug-in changes, where the change processing for the first associated plug-in includes performing upgrading on the first associated plug-in on the device on which the second component is located or deleting the first associated plug-in on the device on which the second component is located.

With reference to the third possible implementation manner of the first aspect, in a fourth possible implementation manner of the first aspect, if the change processing for the first associated plug-in is performing upgrading on the first associated plug-in on the device on which the second component is located, the change information of the first associated plug-in includes an upgrade package that is corresponding to the first associated plug-in.

With reference to the fourth possible implementation manner of the first aspect, in a fifth possible implementation manner of the first aspect, the method further includes:

storing, by the associated plug-in management server device, the change information of the first associated plug-in into the central associated plug-in warehouse on the associated plug-in management server device after performing upgrading on the first associated plug-in, where the change information includes the upgrade package that is corresponding to the first associated plug-in.

With reference to the fourth possible implementation manner of the first aspect, in a sixth possible implementation manner of the first aspect, the method further includes:

synchronizing, by the associated plug-in management server device, the upgrade package that is corresponding to the first associated plug-in from the local associated plug-in warehouse on the associated plug-in agent device into the central associated plug-in warehouse on the associated plug-in management server device before upgrading the first associated plug-in.

With reference to the third possible implementation manner of the first aspect, in a seventh possible implementation manner of the first aspect, if the change processing for the first associated plug-in is deleting the first associated plug-in from the device on which the second component is located, after the first associated plug-in is deleted from the device on which the second component is located, the method further includes:

moving, by the associated plug-in management server device, the first associated plug-in from the central associated plug-in warehouse on the associated plug-in management server device into a central associated plug-in recycling warehouse on the associated plug-in management server device, and controlling the associated plug-in agent device to move the first associated plug-in from the local associated plug-in warehouse on the associated plug-in agent device into a local associated plug-in recycling warehouse on the associated plug-in agent device.

With reference to any one of the first to seventh possible implementation manners of the first aspect, in an eighth possible implementation manner of the first aspect, the method further includes:

synchronizing, by the associated plug-in management server device, a second associated plug-in into the local associated plug-in warehouse on the associated plug-in agent device, where the second associated plug-in exists in the central associated plug-in warehouse on the associated plug-in management server device but does not exist in the local associated plug-in warehouse on the associated plug-in agent device; and installing, by the associated plug-in management server device according to description information of the second associated plug-in and information about a third component that uses the second associated plug-in, the second associated plug-in onto a device on which the third component is located.

With reference to the first aspect or any one of the first to eighth possible implementation manners of the first aspect, in a ninth possible implementation manner of the first aspect, the device on which the second component is located is the associated plug-in agent device; and the installing, by the associated plug-in management server device according to the information about the second component and the description information of the first associated plug-in, the first associated plug-in onto a device on which the second component is located includes:

determining, by the associated plug-in management server device according to the information about the second component, that the device on which the second component is located is the associated plug-in agent device, determining the first associated plug-in according to the description information of the first associated plug-in, and sending an associated plug-in management instruction to the associated plug-in agent device to instruct the associated plug-in agent device to install the first associated plug-in onto the associated plug-in agent device.

With reference to the first aspect or any one of the first to ninth possible implementation manners of the first aspect, in a tenth possible implementation manner of the first aspect, after the obtaining, by an associated plug-in management server device, information about a first associated plug-in by using an associated plug-in agent device, where the first associated plug-in is provided by a first component, the method further includes:

storing, by the associated plug-in management server device, the information about the first associated plug-in into an associated plug-in registry of the associated plug-in management server device, so as to perform centralized management on information about all the associated plug-ins.

With reference to the first aspect or any one of the first to tenth possible implementation manners of the first aspect, in an eleventh possible implementation manner of the first aspect, the obtaining, by an associated plug-in management server device, information about a first associated plug-in by using an associated plug-in agent device, where the first associated plug-in is provided by a first component, includes:

sending, by the associated plug-in management server device, a query request to the associated plug-in agent device, so that the associated plug-in agent device agent obtains information about the first associated plug-in that is provided by the first component by querying the associated plug-in registry on the associated plug-in agent device, and returns the information about the first associated plug-in; and receiving, by the associated plug-in management server device, the information that is about the first associated plug-in and returned by the associated plug-in agent device, where the first associated plug-in is provided by the first component.

With reference to the first aspect or any one of the first to eleventh possible implementation manners of the first aspect, in a twelfth possible implementation manner of the first aspect, the method further includes:

obtaining, by the associated plug-in management server device, information about the first component by using the associated plug-in agent device, and installing the first component onto the associated plug-in management server device according to the information about the first component.

A second aspect of the present invention provides an associated plug-in management method, including:

obtaining, by an associated plug-in agent device, information about a first associated plug-in, where the information about the first associated plug-in includes description information of the first associated plug-in and information about a second component that uses the first associated plug-in and the first associated plug-in is provided by a first component and; and providing, by the associated plug-in agent device, the information about the first associated plug-in for an associated plug-in management server device, so that the associated plug-in management server device installs, according to the information about the second component and the description information of the first associated plug-in, the first associated plug-in onto a device on which the second component is located.

With reference to the second aspect, in a first possible implementation manner of the second aspect, the method further includes:

storing, by the associated plug-in agent device, the first associated plug-in into a local associated plug-in warehouse on the associated plug-in agent device.

With reference to the second aspect or the first possible implementation manner of the second aspect, in a second possible implementation manner of the second aspect, the method further includes:

receiving, by the associated plug-in agent device, an associated plug-in management instruction sent by the associated plug-in management server device, where the associated plug-in management instruction is sent by the associated plug-in management server device after determining that the device on which the second component is located is the associated plug-in agent device and determining the first associated plug-in according to the description information of the first associated plug-in, and is used to instruct the associated plug-in agent device to install the first associated plug-in onto the associated plug-in agent device; and determining, by the associated plug-in agent device, the first associated plug-in according to an instruction of the associated plug-in management instruction, and installing the determined first associated plug-in onto the associated plug-in agent device.

With reference to the first or second possible implementation manner of the second aspect, in a third possible implementation manner of the second aspect, the method further includes:

when the first associated plug-in on the device on which the second component is located needs to be upgraded, storing, by the associated plug-in agent device, an upgrade package of the first associated plug-in into the local associated plug-in warehouse on the associated plug-in agent device, so that the associated plug-in management server device performs upgrade processing on the first associated plug-in after synchronizing the upgrade package of the first associated plug-in from the local associated plug-in warehouse on the associated plug-in agent device into a central associated plug-in warehouse on the associated plug-in management server device.

With reference to the first or second possible implementation manner of the second aspect, in a fourth possible implementation manner of the second aspect, after the first associated plug-in is deleted from the device on which the second component is located, the method further includes:

moving, by the associated plug-in agent device and under control of the associated plug-in management server device, the first associated plug-in from the local associated plug-in warehouse on the associated plug-in agent device into a local associated plug-in recycling warehouse on the associated plug-in agent device.

With reference to the second aspect or any one of the first to fourth possible implementation manners of the second aspect, in a fifth possible implementation manner of the second aspect, the method further includes:

obtaining, by the associated plug-in agent device, information about the first component, and providing the information about the first component for the associated plug-in management server device, so that the associated plug-in management server device installs the first component onto the associated plug-in management server device according to the information about the first component.

With reference to the second aspect or any one of the first to fourth possible implementation manners of the second aspect, in a sixth possible implementation manner of the second aspect, the method further includes:

obtaining, by the associated plug-in agent device, information about the first component, and installing the first component onto the associated plug-in agent device according to the information about the first component.

A third aspect of the present invention provides an associated plug-in management method, including:

obtaining information about a first associated plug-in by using a registration interface provided locally, where the first associated plug-in is provided by a first component, and the information about the first associated plug-in is provided when the first component is registered by using the registration interface, and includes description information of the first associated plug-in and information about a second component that uses the first associated plug-in; and after it is determined, according to the information about the second component, that installation of the second component is complete, installing, according to the information about the second component and the description information of the first associated plug-in, the first associated plug-in onto a device on which the second component is located, where the first component and the second component are installed on the same device.

With reference to the third aspect, in a first possible implementation manner of the third aspect, the method further includes:

storing the first associated plug-in into an associated plug-in warehouse to perform centralized management on all associated plug-ins; and storing the information about the first associated plug-in into an associated plug-in registry to perform centralized management on information about all the associated plug-ins.

With reference to the first possible implementation manner of the third aspect, in a second possible implementation manner of the third aspect, the installing, according to the information about the second component and the description information of the first associated plug-in, the first associated plug-in onto a device on which the second component is located includes:

polling the associated plug-in warehouse, and when it is discovered that the first associated plug-in is added to the associated plug-in warehouse, installing, according to the information about the second component and the description information of the first associated plug-in, the first associated plug-in onto the device on which the second component is located.

With reference to the second possible implementation manner of the third aspect, in a third possible implementation manner of the third aspect, the method further includes:

performing change processing on the first associated plug-in according to the information about the second component and change information of the first associated plug-in when the first associated plug-in changes, where the change processing for the first associated plug-in includes performing upgrading on the first associated plug-in on the device on which the second component is located or deleting the first associated plug-in on the device on which the second component is located.

With reference to the third possible implementation manner of the third aspect, in a fourth possible implementation manner of the third aspect, if the change processing for the first associated plug-in is performing upgrading on the first associated plug-in on the device on which the second component is located, the change information of the first associated plug-in includes an upgrade package that is corresponding to the first associated plug-in; and the method further includes:

storing the change information of the first associated plug-in into the associated plug-in warehouse after performing upgrading on the first associated plug-in, where the change information includes the upgrade package that is corresponding to the first associated plug-in.

With reference to the third aspect or any one of the first to fourth possible implementation manners of the third aspect, in a fifth possible implementation manner of the third aspect, the method further includes:

obtaining information about the first component by using the registration interface, where the information about the first component is provided when the first component is registered by using the registration interface, and installing, according to the information about the first component, the first component onto the device on which the second component is located.

A fourth aspect of the present invention provides an associated plug-in management server device, including:

an obtaining module, configured to obtain information about a first associated plug-in by using an associated plug-in agent device, where the information about the first associated plug-in includes description information of the first associated plug-in and information about a second component that uses the first associated plug-in, and the first associated plug-in is provided by a first component; and an installing module, configured to: after it is determined, according to the information about the second component, that installation of the second component is complete, install, according to the information about the second component and the description information of the first associated plug-in, the first associated plug-in onto a device on which the second component is located.

With reference to the fourth aspect, in a first possible implementation manner of the fourth aspect, the device further includes:

a synchronizing module, configured to: when the first associated plug-in is stored in a local associated plug-in warehouse on the associated plug-in agent device, perform synchronization on a central associated plug-in warehouse on the associated plug-in management server device and the local associated plug-in warehouse on the associated plug-in agent device, so as to synchronize the first associated plug-in into the central associated plug-in warehouse on the associated plug-in management server device.

With reference to the first possible implementation manner of the fourth aspect, in a second possible implementation manner of the fourth aspect, the installing module is specifically configured to poll the central associated plug-in warehouse on the associated plug-in management server device, and when it is discovered that the first associated plug-in is added to the central associated plug-in warehouse on the associated plug-in management server device, install, according to the information about the second component and the description information of the first associated plug-in, the first associated plug-in onto the device on which the second component is located.

With reference to the second possible implementation manner of the fourth aspect, in a third possible implementation manner of the fourth aspect, the device further includes:

a change processing module, configured to perform change processing for the first associated plug-in according to the information about the second component and change information of the first associated plug-in when the first associated plug-in changes, where the change processing for the first associated plug-in includes performing upgrading on the first associated plug-in on the device on which the second component is located or deleting the first associated plug-in on the device on which the second component is located.

With reference to the third possible implementation manner of the fourth aspect, in a fourth possible implementation manner of the fourth aspect, if the change processing for the first associated plug-in is performing upgrading on the first associated plug-in on the device on which the second component is located, the change processing module is further configured to output the change information of the first associated plug-in, where the change information of the first associated plug-in includes an upgrade package that is corresponding to the first associated plug-in.

With reference to the fourth possible implementation manner of the fourth aspect, in a fifth possible implementation manner of the fourth aspect, the change processing module is further configured to store the change information of the first associated plug-in into the central associated plug-in warehouse on the associated plug-in management server device after performing upgrading on the first associated plug-in, where the change information includes the upgrade package that is corresponding to the first associated plug-in.

With reference to the fourth possible implementation manner of the fourth aspect, in a sixth possible implementation manner of the fourth aspect, the synchronizing module is further configured to synchronize the upgrade package that is corresponding to the first associated plug-in from the local associated plug-in warehouse on the associated plug-in agent device into the central associated plug-in warehouse on the associated plug-in management server device before the change processing module upgrades the first associated plug-in.

With reference to the third possible implementation manner of the fourth aspect, in a seventh possible implementation manner of the fourth aspect, the device further includes:

a removing module, configured to: when the change processing for the first associated plug-in is deleting the first associated plug-in from the device on which the second component is located, after the change processing module deletes the first associated plug-in from the device on which the second component is located, move the first associated plug-in from the central associated plug-in warehouse on the associated plug-in management server device into a central associated plug-in recycling warehouse on the associated plug-in management server device, and control the associated plug-in agent device to move the first associated plug-in from the local associated plug-in warehouse on the associated plug-in agent device into a local associated plug-in recycling warehouse on the associated plug-in agent device.

With reference to any one of the first to seventh possible implementation manners of the fourth aspect, in an eighth possible implementation manner of the fourth aspect, the synchronizing module is further configured to synchronize a second associated plug-in into the local associated plug-in warehouse on the associated plug-in agent device, where the second associated plug-in exists in the central associated plug-in warehouse on the associated plug-in management server device but does not exist in the local associated plug-in warehouse on the associated plug-in agent device; and the installing module is further configured to install, according to description information of the second associated plug-in and information about a third component that uses the second associated plug-in, the second associated plug-in onto a device on which the third component is located.

With reference to the fourth aspect or any one of the first to eighth possible implementation manners of the fourth aspect, in a ninth possible implementation manner of the fourth aspect, the device on which the second component is located is the associated plug-in agent device; and the installing module is specifically configured to determine, according to the information about the second component, that the device on which the second component is located is the associated plug-in agent device, determine the first associated plug-in according to the description information of the first associated plug-in, and send an associated plug-in management instruction to the associated plug-in agent device to instruct the associated plug-in agent device to install the first associated plug-in onto the associated plug-in agent device.

With reference to the fourth aspect or any one of the first to ninth possible implementation manners of the fourth aspect, in a tenth possible implementation manner of the fourth aspect, the device further includes:

a storing module, configured to store an associated plug-in registry, where the associated plug-in registry records the information about the first associated plug-in, so that the associated plug-in management server device performs centralized management on information about all associated plug-ins.

With reference to the fourth aspect or any one of the first to tenth possible implementation manners of the fourth aspect, in an eleventh possible implementation manner of the fourth aspect, the obtaining module is specifically configured to send a query request to the associated plug-in agent device and receive the information about the first associated plug-in, where the information about the first associated plug-in that is provided by the first component is returned by the associated plug-in agent device in response to the query request, and the information about the first associated plug-in that is provided by the first component is obtained by the associated plug-in agent device by querying the associated plug-in registry on the associated plug-in agent device, and returned.

With reference to the fourth aspect or any one of the first to eleventh possible implementation manners of the fourth aspect, in a twelfth possible implementation manner of the fourth aspect, the obtaining module is further configured to obtain information about the first component by using the associated plug-in agent device; and the installing module is further configured to install the first component onto the associated plug-in management server device according to the information about the first component.

A fifth aspect of the present invention provides an associated plug-in agent device, including:

an obtaining module, configured to obtain information about a first associated plug-in, where the information about the first associated plug-in includes description information of the first associated plug-in and information about a second component that uses the first associated plug-in, and the first associated plug-in is provided by a first component; and a providing module, configured to provide the information about the first associated plug-in for an associated plug-in management server device, so that the associated plug-in management server device installs, according to the information about the second component and the description information of the first associated plug-in, the first associated plug-in onto a device on which the second component is located.

With reference to the fifth aspect, in a first possible implementation manner of the fifth aspect, the device further includes:

a first storing module, configured to store the first associated plug-in, where the first storing module is used as a local associated plug-in warehouse of the associated plug-in agent device.

With reference to the fifth aspect or the first possible implementation manner of the fifth aspect, in a second possible implementation manner of the fifth aspect, the device further includes:

a receiving module, configured to receive an associated plug-in management instruction sent by the associated plug-in management server device, where the associated plug-in management instruction is sent by the associated plug-in management server device after determining that the device on which the second component is located is the associated plug-in agent device and determining the first associated plug-in according to the description information of the first associated plug-in, and is used to instruct the associated plug-in agent device to install the first associated plug-in onto the associated plug-in agent device; and a first installing module, configured to determine the first associated plug-in as indicated by the associated plug-in management instruction, and install the determined first associated plug-in onto the associated plug-in agent device.

With reference to the first or second possible implementation manner of the fourth aspect, in a third possible implementation manner of the fourth aspect, the first storing module is further configured to store an upgrade package of the first associated plug-in, so that the associated plug-in management server device performs upgrade processing on the first associated plug-in according to the stored upgrade package of the first associated plug-in when the first associated plug-in on the device on which the second component is located needs an upgrade.

With reference to the first or second possible implementation manner of the fourth aspect, in a fourth possible implementation manner of the fourth aspect, the device further includes:

a removing module, configured to move, under control of the associated plug-in management server device after the first associated plug-in is deleted from the device on which the second component is located, the first associated plug-in from the first storing module into a second storing module on the associated plug-in agent device; and the second storing module, configured to store the first associated plug-in moved from the first storing module, where the second storing module is used as a local associated plug-in recycling warehouse of the associated plug-in agent device.

With reference to the fourth aspect or any one of the first to fourth possible implementation manners of the fourth aspect, in a fifth possible implementation manner of the fourth aspect, the obtaining module is further configured to obtain information about the first component; and the providing module is further configured to provide the information about the first component for the associated plug-in management server device, so that the associated plug-in management server device installs the first component onto the associated plug-in management server device according to the information about the first component.

With reference to the fourth aspect or any one of the first to fourth possible implementation manners of the fourth aspect, in a sixth possible implementation manner of the fourth aspect, the obtaining module is further configured to obtain information about the first component; and a second installing module is configured to install the first component onto the associated plug-in agent device according to the information about the first component.

A sixth aspect of the present invention provides an associated plug-in management device, including:

an obtaining module, configured to obtain information about a first associated plug-in by using a registration interface provided locally, where the first associated plug-in is provided by a first component, and the information about the first associated plug-in is provided when the first component is registered by using the registration interface, and includes description information of the first associated plug-in and information about a second component that uses the first associated plug-in; and after it is determined, according to the information about the second component, that installation of the second component is complete, an installing module, configured to install, according to the information about the second component and the description information of the first associated plug-in, the first associated plug-in onto a device on which the second component is located, where the first component and the second component are installed on the same device.

With reference to the fifth aspect, in a first possible implementation manner of the fifth aspect, the device further includes:

a third storing module, configured to store the first associated plug-in so that the associated plug-in management device performs centralized management on all associated plug-ins, where the third storing module is used as an associated plug-in warehouse of the associated plug-in management device; and a fourth storing module, configured to store an associated plug-in registry, where the information about the first associated plug-in that is provided by the first component is recorded in the associated plug-in registry, so that the associated plug-in management device performs centralized management on information about all the associated plug-ins.

With reference to the first possible implementation manner of the fifth aspect, in a second possible implementation manner of the fifth aspect, the installing module is specifically configured to poll the third storing module, and when it is discovered that the first associated plug-in is added to the third storing module, install, according to the information about the second component and the description information of the first associated plug-in, the first associated plug-in onto the device on which the second component is located.

With reference to the second possible implementation manner of the fifth aspect, in a third possible implementation manner of the fifth aspect, the device further includes:

a change processing module, configured to perform change processing for the first associated plug-in according to the information about the second component and change information of the first associated plug-in when the first associated plug-in changes, where the change processing for the first associated plug-in includes performing upgrading on the first associated plug-in on the device on which the second component is located or deleting the first associated plug-in on the device on which the second component is located.

With reference to the third possible implementation manner of the fifth aspect, in a fourth possible implementation manner of the fifth aspect, if the change processing for the first associated plug-in is performing upgrading on the first associated plug-in on the device on which the second component is located, the change processing module is further configured to output the change information of the first associated plug-in, where the change information of the first associated plug-in includes an upgrade package that is corresponding to the first associated plug-in; and the third storing module is further configured to store the change information of the first associated plug-in, where the change information includes the upgrade package that is corresponding to the first associated plug-in.

With reference to the fifth aspect or any one of the first to fourth possible implementation manners of the fifth aspect, in a fifth possible implementation manner of the fifth aspect, the obtaining module is further configured to obtain information about the first component by using the registration interface, where the information about the first component is provided when the first component is registered by using the registration interface; and the installing module is further configured to install, according to the information about the first component, the first component onto the device on which the second component is located.

A seventh aspect of the present invention provides a master server, where the master server is communicatively connected to at least one slave server, at least one component is deployed on each of the master server and the slave server, a first component and a second component are included in all components deployed on the master server and the slave server, and a first associated plug-in exists between the first component and the second component; and the master server further includes an associated plug-in management server, where the associated plug-in management server is an associated plug-in management server device described above.

A eighth aspect of the present invention provides a slave server, where the slave server is communicatively connected to a master server, at least one component is deployed on each of the slave server and the master server, a first component and a second component are included in all components deployed on the slave server and the master server, and a first associated plug-in exists between the first component and the second component; and the slave server further includes an associated plug-in agent, where the associated plug-in agent is an associated plug-in agent device described above.

An ninth aspect of the present invention provides a server, where at least two components are deployed on the server, the at least two components include a first component and a second component, and a first associated plug-in exists between the first component and the second component; and the server further includes an associated plug-in manager, where the associated plug-in manager is an associated plug-in management device described above.

A tenth aspect of the present invention provides an associated plug-in management system, including an associated plug-in management server device and at least one associated plug-in agent device; where the associated plug-in management server device is configured to obtain information about a first associated plug-in by using the associated plug-in agent device, where the information about the first associated plug-in includes description information of the first associated plug-in and information about a second component that uses the first associated plug-in, and the first associated plug-in is provided by a first component; and after it is determined, according to the information about the second component, that installation of the second component is complete, install, according to the information about the second component and the description information of the first associated plug-in, the first associated plug-in onto a device on which the second component is located; and the associated plug-in agent device is configured to obtain the information about the first associated plug-in that is provided by the first component, and provide the information about the first associated plug-in for the associated plug-in management server device.

With reference to the ninth aspect, in a first possible implementation manner of the ninth aspect, the associated plug-in agent device is further configured to store the first associated plug-in into a local associated plug-in warehouse on the associated plug-in agent device; and the associated plug-in management server device is further configured to perform synchronization between a central associated plug-in warehouse on the associated plug-in management server device and the local associated plug-in warehouse on the associated plug-in agent device, so as to synchronize the first associated plug-in into the central associated plug-in warehouse on the associated plug-in management server device.

With reference to the first possible implementation manner of the ninth aspect, in a second possible implementation manner of the ninth aspect, the associated plug-in management server device is specifically configured to poll the central associated plug-in warehouse on the associated plug-in management server device, and when it is discovered that the first associated plug-in is added to the central associated plug-in warehouse on the associated plug-in management server device, install, according to the information about the second component and the description information of the first associated plug-in, the first associated plug-in onto the device on which the second component is located.

With reference to the second possible implementation manner of the ninth aspect, in a third possible implementation manner of the ninth aspect, the associated plug-in management server device is further configured to perform change processing on the first associated plug-in according to the information about the second component and change information of the first associated plug-in when the first associated plug-in changes, where the change processing for the first associated plug-in includes performing upgrading on the first associated plug-in on the device on which the second component is located or deleting the first associated plug-in on the device on which the second component is located.

With reference to the third possible implementation manner of the ninth aspect, in a fourth possible implementation manner of the ninth aspect, if the change processing for the first associated plug-in is performing upgrading on the first associated plug-in on the device on which the second component is located, the change information of the first associated plug-in includes an upgrade package that is corresponding to the first associated plug-in.

With reference to the fourth possible implementation manner of the ninth aspect, in a fifth possible implementation manner of the ninth aspect, the associated plug-in management server device is further configured to store the change information of the first associated plug-in into the central associated plug-in warehouse on the associated plug-in management server device after performing upgrading on the first associated plug-in, where the change information includes the upgrade package that is corresponding to the first associated plug-in.

With reference to the fourth possible implementation manner of the ninth aspect, in a sixth possible implementation manner of the ninth aspect, the associated plug-in agent device is further configured to store the upgrade package that is corresponding to the first associated plug-in into the local associated plug-in warehouse on the associated plug-in agent device before the associated plug-in management server device performs upgrade processing on the first associated plug-in; and the associated plug-in management server device is further configured to synchronize the upgrade package that is corresponding to the first associated plug-in from the local associated plug-in warehouse on the associated plug-in agent device into the central associated plug-in warehouse on the associated plug-in management server device before upgrading the first associated plug-in.

With reference to the third possible implementation manner of the ninth aspect, in a seventh possible implementation manner of the ninth aspect, the associated plug-in management server device is further configured to: when the change processing for the first associated plug-in is the deleting the first associated plug-in from the device on which the second component is located, after the first associated plug-in is deleted from the device on which the second component is located, move the first associated plug-in from the central associated plug-in warehouse on the associated plug-in management server device into a central associated plug-in recycling warehouse on the associated plug-in management server device, and control the associated plug-in agent device to move the first associated plug-in from the local associated plug-in warehouse on the associated plug-in agent device into a local associated plug-in recycling warehouse on the associated plug-in agent device.

With reference to the ninth aspect or the first to seventh possible implementation manners of the ninth aspect, in an eighth possible implementation manner of the ninth aspect, the associated plug-in agent device is further configured to obtain information about the first component, and provide the information about the first component for the associated plug-in agent device; and the associated plug-in agent device is further configured to install the first component onto the associated plug-in management server device according to the information about the first component.

With reference to the ninth aspect or the first to seventh possible implementation manners of the ninth aspect, in a ninth possible implementation manner of the ninth aspect, the associated plug-in agent device is further configured to obtain information about the first component, and install the first component onto the associated plug-in agent device according to the information about the first component.

A eleventh aspect of the present invention provides a distributed system, including a master server and at least one slave server, where at least one component is deployed on each of the master server and the slave server, a first component and a second component are included in all components deployed on the master server and the slave server, and a first associated plug-in exists between the first component and the second component, where the master server further includes an associated plug-in management server, where the associated plug-in management server is an associated plug-in management server device described above; and the slave server further includes an associated plug-in agent, where the associated plug-in agent is an associated plug-in agent device described above.

According to the associated plug-in management method, device and system provided in the embodiments of the present invention, a first associated plug-in and a second component that uses the first associated plug-in are determined by obtaining description information of the first associated plug-in and information about the second component that uses the associated plug-in, where the description information of the first associated plug-in and the information about second component are provided by a first component; and then, based on the information about the second component and the description information of the first associated plug-in, the first associated plug-in is installed onto a device on which the second component is located. In the embodiments of the present invention, based on the obtaining description information of the associated plug-in and the information about a component that uses the associated plug-in, an installation process of the associated plug-in may be independent of an installation process of the component that uses the associated plug-in, and unified and automated installation of the associated plug-in is implemented, so that deployment of components related to the associated plug-in is no longer dependent on each other and decoupling during deployment of components related to an associated plug-in is implemented when the components are deployed.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

For ease of understanding the embodiments of the present invention, several elements that may be introduced in describing the embodiments of the present invention are described herein first:

application: an application program, which is software that provides a certain service;

component: a part that provides a certain specific function in an application, where generally a component may be installed selectively, and the component may be deployed on one server or deployed on different servers in a distributed manner, and may also be called a service component;

associated plug-in: a module that is developed by a component B through an extended interface defined by a component A, where the component A exchanges data with the component B by using an associated plug-in A' provided by the component B; and generally, a strict version matching relationship exists between the associated plug-in A', the component A, and the component B, and cannot be used arbitrarily, where the component A is defined as a user of the associated plug-in A' and the component B is defined as a provider of the associated plug-in A; and synchronization of an associated plug-in: performing installation, upgrade and deletion of the associated plug-in according to installation, upgrade and deletion situations of a component.

Figure 1:
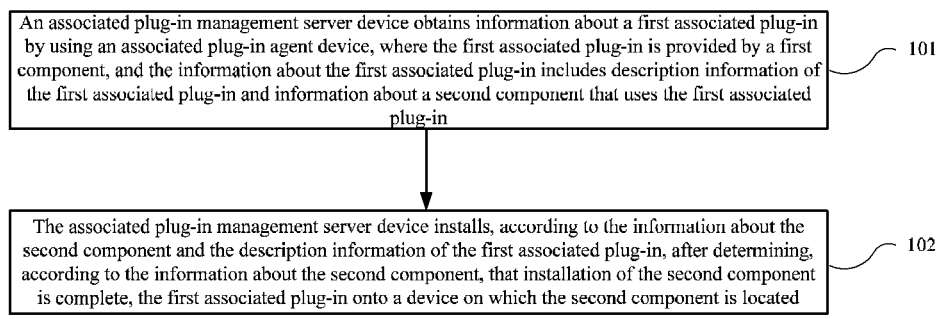
FIG. 1 is a flowchart of an associated plug-in management method according to an embodiment of the present invention.

FIG. 1 is a flowchart of an associated plug-in management method according to an embodiment of the present invention. As shown in FIG. 1, the method includes:

101. An associated plug-in management server device obtains information about a first associated plug-in by using an associated plug-in agent device, where the information about the first associated plug-in includes description information of the first associated plug-in and information about a second component that uses the first associated plug-in, and the first associated plug-in is provided by a first component.

102. After it is determined, according to the information about the second component, that installation of the second component is complete, the associated plug-in management server device installs, according to the information about the second component and the description information of the first associated plug-in, the first associated plug-in onto a device on which the second component is located.

To solve a problem of mutual dependence and close coupling during deployment of components related to an associated plug-in in the prior art, an associated plug-in management method is provided in the embodiment of the present invention. The associated plug-in management method provided in this embodiment primarily involves an associated plug-in management server device and an associated plug-in agent device, and is applicable to an application scenario of distributed deployment of components. The application scenario of distributed deployment of components may be distributed deployment of components in a same application system, or may be distributed deployment of components in different application systems, where the application system may be an alarm system, a network topology system, a security subsystem, and the like. The associated plug-in management server device primarily implements management of the associated plug-in, which primarily includes installation, upgrade, deletion, distribution, and the like, of the associated plug-in. The associated plug-in agent device is primarily responsible for registration of components, and the like, so as to provide the associated plug-in management server device with information about the associated plug-in that is provided by a component.

In actual application, the associated plug-in agent device may obtain the information about the associated plug-in that is provided by the component. An implementation manner of obtaining, by the associated plug-in agent device, the information about the associated plug-in that is provided by the component includes but is not limited to the following manners:

For example, when each component is installed, the component to be installed needs to perform registration of a potential user of the associated plug-in and provides information about the component itself, where the information provided for registering the component to be installed includes but is not limited to a type of the component to be installed, a version number of the component to be installed, and the like. The type of the component to be installed is mandatory information, and may be formed of a name of the component to be installed, a position of the component, a feature of the component, and the like, and may indicate whether the component to be installed is a user or a provider of the associated plug-in.

Further, if the component to be installed is a provider of the associated plug-in, at the time of registration, not only the information about the component to be installed but also the information about the associated plug-in need to be provided. The information about the associated plug-in includes but is not limited to description information of the associated plug-in and information about a user (that is, the component that uses the associated plug-in) of the associated plug-in. For example, the information about the associated plug-in that is provided by the component to be installed at the time of registration may further include version compatibility information about the associated plug-in, version compatibility information about the user of the associated plug-in, and the like.

Not only may the component to be installed provide the information about the associated plug-in in a manner of registration, but also an installed component or a component that does not need to be installed currently may provide, in a manner of registration, information about the associated plug-in that is provided by the component itself.

In addition, the associated plug-in agent device may also obtain, in another manner other than registration, the information about the associated plug-in that is provided by each component. For example, an administrator or an operator pre-stores the information about the associated plug-in that is provided by each component, to a local address of the associated plug-in agent device beforehand.

In this embodiment, for ease of description, the component that provides the associated plug-in is called a first component, and the associated plug-in provided by the first component is called a first associated plug-in, and the user of the first associated plug-in is called a second component. It is hereby specified that the first component involved in this embodiment may be a component to be installed, an installed component, or a component that does not need to be installed currently, which is not limited herein.

For example, it is assumed that the first component is a component to be installed, the first component may register with the associated plug-in agent device mentioned in this embodiment, and provide the information about the first associated plug-in that is provided by the first component. In this way, the associated plug-in agent device can learn the information about the first associated plug-in that is provided by the first component. It is hereby specified that when the first component is a component to be installed, that which specific device the first component is installed on is not limited in this embodiment. For example, the first component may be installed on an associated plug-in management server device, installed on an associated plug-in agent device, or installed on another device that is different from the associated plug-in management server device and the associated plug-in agent device. The embodiment of the present invention focuses on a situation in which the first component is installed on the associated plug-in management server device or the associated plug-in agent device, a specific process thereof is described in subsequent parts.

In an optional implementation manner, the associated plug-in agent device may provide an associated plug-in registry locally for storing information about the associated plug-in. Based on this, a specific implementation manner of step 101 includes that: the associated plug-in management server device may send a query request to the associated plug-in agent device, so that the associated plug-in agent device agent obtains information about the first associated plug-in that is provided by the first component by querying the associated plug-in registry on the associated plug-in agent device, and returns the information about the first associated plug-in; and the associated plug-in management server device receives the information that is about the first associated plug-in and returned by the associated plug-in agent device, where the first associated plug-in is provided by the first component.

After obtaining the description information of the first associated plug-in and the information about the second component that uses the first associated plug-in and after determining, according to the information about the second component, that installation of the second component is complete, the associated plug-in management server device installs, according to information about the second component and description information of the first associated plug-in, the first associated plug-in onto a device on which the second component is located.

In this embodiment, the associated plug-in management server device may obtain the description information of the first associated plug-in and the information about the second component that uses the first associated plug-in by using the associated plug-in agent device, where the description information of the first associated plug-in and the information about the second component are provided by the first component; and then, based on the obtained information, may separately perform processing on installation of the first associated plug-in used by the second component. In this way, the installation of the second component is independent of the installation of the first associated plug-in used by the second component, and loose coupling during deployment of components related to an associated plug-in is implemented.

In an optional implementation manner, storage management is performed on the associated plug-in by using an associated plug-in warehouse. The associated plug-in warehouse includes a local associated plug-in warehouse that is set on the associated plug-in agent device side and a central associated plug-in warehouse that is set on the associated plug-in management server device side. After obtaining the information about the first associated plug-in that is provided by the first plug-in, the associated plug-in agent device may store the first associated plug-in into the local associated plug-in warehouse on the associated plug-in agent device side. Based on this, the associated plug-in management method provided in this embodiment further includes: performing, by the associated plug-in management server device, synchronization on the central associated plug-in warehouse on the associated plug-in management server device and the local associated plug-in warehouse on the associated plug-in agent device, so as to synchronize the first associated plug-in into the central associated plug-in warehouse on the associated plug-in management server device.

Based on the foregoing description, a specific implementation manner of step 102 includes: polling, by the associated plug-in management server device, the central associated plug-in warehouse on the associated plug-in management server device, and when it is discovered that the first associated plug-in is added to the central associated plug-in warehouse on the associated plug-in management server device, installing, according to the information about the second component and the description information of the first associated plug-in, the first associated plug-in onto the device on which the second component is located.

It is hereby specified that, the device on which the second component is located may be the associated plug-in management server device, may be the associated plug-in agent device, or may be another device that is different from the associated plug-in management server device and the associated plug-in agent device. The embodiment of the present invention focuses on a situation in which the device on which the second component is located is the associated plug-in management server device or the associated plug-in agent device. An implementation process of installing, by the associated plug-in management server device according to the information about the second component and the description information of the first associated plug-in, the first associated plug-in onto the device on which the second component is located may differ depending on the device on which the second component is located. The following uses examples for description with reference to a specific application scenario.

For example, if the device on which the second component is located is the associated plug-in management server device, the installing, by the associated plug-in management server device according to the information about the second component and the description information of the first associated plug-in, the first associated plug-in onto a device on which the second component is located includes that: when it is discovered that the first associated plug-in is added to the central associated plug-in warehouse on the associated plug-in management server device, the associated plug-in management server device may determine, according to the information about the second component, that the device on which the second component is located is the associated plug-in management server device, further determine the first associated plug-in according to the description information of the first associated plug-in, then may obtain the first associated plug-in directly from the central associated plug-in warehouse on the associated plug-in management server device, and then install the obtained first associated plug-in onto the associated plug-in management server device directly.

For another example, if the device on which the second component is located is the associated plug-in agent device, the installing, by the associated plug-in management server device according to the information about the second component and the description information of the first associated plug-in, the first associated plug-in onto the device on which the second component is located includes that: when it is discovered that the first associated plug-in is added to the central associated plug-in warehouse on the associated plug-in management server device, the associated plug-in management server device may determine, according to the information about the second component, that the device on which the second component is located is the associated plug-in agent device, determine the first associated plug-in according to the description information of the first associated plug-in, and then send an associated plug-in management instruction to the associated plug-in agent device to instruct the associated plug-in agent device to install the first associated plug-in onto the associated plug-in agent device. Correspondingly, after receiving the associated plug-in management instruction, the associated plug-in agent device determines the first associated plug-in according to an instruction of the associated plug-in management instruction, and then installs the first associated plug-in onto the associated plug-in agent device. Optionally, after determining the first associated plug-in, the associated plug-in agent device may obtain the first plug-in directly from the local associated plug-in warehouse on the associated plug-in agent device, and then install the first plug-in onto the associated plug-in agent device.

It is hereby specified that a manner of instructing the first associated plug-in by the associated plug-in management server device by means of the associated plug-in management instruction is not limited in this embodiment. For example, the associated plug-in management server device may make the associated plug-in management instruction carry an identifier of the first associated plug-in, so that the associated plug-in agent device can determine the first associated plug-in according to the identifier of the first associated plug-in that is carried in the associated plug-in management instruction. For another example, the associated plug-in agent device and the associated plug-in management server device may pre-agree to perform processing according to an order of associated plug-ins, that is, processes another associated plug-in after processing of one associated plug-in is complete. In this way, the associated plug-in agent device may determine, according to the information about the associated plug-in that is provided for the associated plug-in management server device before the associated plug-in management instruction is received, which associated plug-in corresponds to the received associated plug-in management instruction. In the latter manner, the associated plug-in management server device does not need to make the associated plug-in management instruction carry any information, which facilitates to reduce the load of the associated plug-in management server device.

For another example, the device on which the second component is located may be another device different from the associated plug-in agent device and the associated plug-in management server device, and, in this case, the installing, by the associated plug-in management server device according to the information about the second component and the description information of the first associated plug-in, the first associated plug-in onto a device on which the second component is located includes that: the associated plug-in management server device may also determine, according to the information about the second component when it is discovered that the first associated plug-in is added to the central associated plug-in warehouse on the associated plug-in management server device, the device on which the second component is located, determine the first associated plug-in according to the description information of the first associated plug-in, then generate an associated plug-in management instruction that carries an identifier of the device on which the second component is located and the identifier of the first associated plug-in, and send the associated plug-in management instruction to the associated plug-in agent device so that the associated plug-in agent device installs the first associated plug-in onto the device on which the second component is located, which, however, is not limited herein. For another example, in a situation in which the device on which the second component is located is another device different from the associated plug-in agent device and the associated plug-in management server device, the associated plug-in management server device may send an associated plug-in management instruction that does not carry any information to the associated plug-in agent device after determining the device on which the second component is located and the first associated plug-in, and the associated plug-in agent device is responsible for determining, according to a specific rule or policy and according to the associated plug-in management instruction, the device on which the second component is located and the first associated plug-in, and then installing the first associated plug-in onto the device on which the second component is located. In this implementation manner, the associated plug-in agent device may have a function similar to the associated plug-in management server device, and therefore, that the first associated plug-in is installed onto the device on which the second component is located is complete Further, on a basis of the central associated plug-in warehouse and the local associated plug-in warehouse, the associated plug-in management method provided in this embodiment further includes: performing, by the associated plug-in management server device, change processing on the first associated plug-in according to the information about the second component and change information of the first associated plug-in when it is discovered that the first associated plug-in changes, where the change processing for the first associated plug-in includes performing upgrading on the first associated plug-in on the device on which the second component is located or deleting the first associated plug-in on the device on which the second component is located.

It is hereby specified that the associated plug-in management server device may learn whether the first associated plug-in changes. For example, when a component and/or an associated plug-in need to be upgraded, an administrator may store an upgrade package that is corresponding to the related component and/or associated plug-in onto the associated plug-in management server device. In this way, the associated plug-in management server device can learn, by determining, whether the first associated plug-in needs to be upgraded. For another example, when a component and/or an associated plug-in needs to be deleted, the associated plug-in management server device may receive a related deletion instruction, and can learn, by determining, whether the first associated plug-in needs to be deleted from the device on which the second component is located. For another example, when a component and/or an associated plug-in needs to be upgraded, the administrator may also store the upgrade package that is corresponding to the related component and/or associated plug-in onto the local associated plug-in warehouse on the associated plug-in agent device. In this way, the associated plug-in management server device may discover, by performing synchronization on the central associated plug-in warehouse and the local associated plug-in warehouse, that the first associated plug-in needs to be upgraded.

It is hereby specified that if the change processing for the first associated plug-in is performing upgrading on the first associated plug-in on the device on which the second component is located, the change information of the first associated plug-in includes an upgrade package that is corresponding to the first associated plug-in.

Based on the performing upgrade processing on the first associated plug-in, one situation is that: The upgrade package that is corresponding to the first associated plug-in is stored on the associated plug-in management server device, and therefore, the associated plug-in management server device may upgrade the first associated plug-in directly according to the upgrade package that is corresponding to the first associated plug-in, that is, install the upgrade package that is corresponding to the first associated plug-in on the device on which the second component is located. The associated plug-in management server device may store change information of the first associated plug-in into the central associated plug-in warehouse on the associated plug-in management server device after performing upgrading on the first associated plug-in, where the change information includes the upgrade package that is corresponding to the first associated plug-in, where the associated plug-in management server device performs management on an associated plug-in by using the central associated plug-in warehouse.

Based on the performing upgrade processing on the first associated plug-in, another situation is that: The upgrade package that is corresponding to the first associated plug-in is stored on the associated plug-in agent device, and the associated plug-in agent device may store the upgrade package that is corresponding to the first associated plug-in into the local associated plug-in warehouse on the associated plug-in agent device. Based on this, the associated plug-in management server device synchronizes the upgrade package that is corresponding to the first associated plug-in from the local associated plug-in warehouse on the associated plug-in agent device into the central associated plug-in warehouse on the associated plug-in management server device before upgrading the first associated plug-in, then upgrades the first associated plug-in according to the upgrade package that is corresponding to the first associated plug-in, that is, obtains the upgrade package that is corresponding to the first associated plug-in from the central associated plug-in warehouse on the associated plug-in management server device, and then installs the obtained upgrade package that is corresponding to the first associated plug-in onto the device on which the second component is located.

It is hereby specified that a process of performing upgrade processing on the first associated plug-in by the associated plug-in management server device upgrades according to the upgrade package that is corresponding to the first associated plug-in may differ depending on the device on which the second component is located. For details, reference may be made to corresponding description about that: the associated plug-in management server device installs, according to the information about the second component and the description information of the first associated plug-in in different situations of the device on which the second component is located, the first associated plug-in onto the device on which the second component is located, which is not detailed herein.

In an optional implementation manner, not only storage management is performed on the associated plug-in by using an associated plug-in warehouse, recycling management is also performed for the associated plug-in by using a associated plug-in recycling warehouse, where the associated plug-in recycling warehouse includes a local associated plug-in recycling warehouse that is set on the associated plug-in agent device side and a central associated plug-in recycling warehouse that is set on the associated plug-in management server device side. Based on this, in a situation in which deletion processing is performed for the first associated plug-in, after deleting the first associated plug-in from the device on which the second component is located, the associated plug-in management server device may further move the first associated plug-in from the central associated plug-in warehouse on the associated plug-in management server device into a central associated plug-in recycling warehouse on the associated plug-in management server device, and control the associated plug-in agent device to move the first associated plug-in from the local associated plug-in warehouse on the associated plug-in agent device into a local associated plug-in recycling warehouse on the associated plug-in agent device. For example, the associated plug-in management server device may send a removal instruction to the associated plug-in agent device, where the removal instruction is used to instruct the associated plug-in agent device to move the first associated plug-in from the local associated plug-in warehouse on the associated plug-in agent device into the local associated plug-in recycling warehouse on the associated plug-in agent device. However, this implementation manner is not construed as a limitation.

Further, in an optional implementation manner, the associated plug-in management server device may not only synchronize the first associated plug-in from the local associated plug-in warehouse on the associated plug-in agent device into the central associated plug-in warehouse on the associated plug-in management server device, but also synchronize a second associated plug-in into the local associated plug-in warehouse on the associated plug-in agent device, where the second associated plug-in exists in the central associated plug-in warehouse on the associated plug-in management server device but does not exist in the local associated plug-in warehouse on the associated plug-in agent device. Subsequently, the associated plug-in management server device installs, according to description information of the second associated plug-in and information about a third component that uses the second associated plug-in, the second associated plug-in onto a device on which the third component is located.

Optionally, the associated plug-in management server device may regularly poll the central associated plug-in warehouse on the associated plug-in management server device and the local associated plug-in warehouse on the associated plug-in agent device, so as to discover different associated plug-ins between the two warehouses.

It is hereby specified that an implementation manner of installing the second associated plug-in onto the device on which the third component is located by the associated plug-in management server device may differ depending on the device on which the third component is located. For details, reference may be made to the implementation manner of installing the first associated plug-in onto the device on which the second component is located, which is not repeatedly described herein.

Further, in an optional implementation manner, an associated plug-in registry may also be set in the associated plug-in management server device, where the associated plug-in registry is used to store information about associated plug-ins and implement centralized management on the information about all associated plug-ins. Based on this, after obtaining the information about the first associated plug-in that is provided by the first component, the associated plug-in management server device may store the information about the first associated plug-in that is provided by the first component into the associated plug-in registry of the associated plug-in management server device, so as to perform centralized management on the information about all the associated plug-ins.

In an optional implementation manner, in a situation in which the first component is a component to be installed, the first component needs to be installed on the associated plug-in management server device. Based on this, the associated plug-in management method provided in this embodiment further includes: obtaining, by the associated plug-in management server device, information about the first component by using the associated plug-in agent device, and installing the first component onto the associated plug-in management server device according to the information about the first component.

It is hereby specified that, the associated plug-in management server device obtains the information about the first component by using the associated plug-in agent device and the associated plug-in management server device obtains the information about the first associated plug-in by using the associated plug-in agent device may be complete in a same process and may also be completed in different processes, where the information about the first associated plug-in is provided by the first component.

Further, optionally, the associated plug-in management server device may also store the information about the first component into the associated plug-in registry of the associated plug-in management server device, so as to perform centralized management on information about all components. For example, if the first component needs to be installed with an associated plug-in, the associated plug-in management server device may determine, according to the information about the first component that is stored in the associated plug-in registry, the device on which the first component is located, so as to install the related associated plug-in onto the device on which the first component is located. It is hereby specified that the process of installing the related associated plug-in for the first component is the same as the process of installing the first associated plug-in for the second component, and is not repeatedly described herein.

In an optional implementation manner, in a situation in which the first component is a component to be installed, the first component needs to be installed on the associated plug-in agent device. Therefore, the associated plug-in agent device may obtain the information about the first component, and install the first component onto the associated plug-in agent device according to the information about the first component.

As can be seen from the foregoing description, according to the associated plug-in management method provided in this embodiment, an associated plug-in management server device obtains, by using an associated plug-in agent device, description information of a first associated plug-in and information about a second component that uses the associated plug-in, where the description information of the first associated plug-in and the information about the second component are provided by a first component, so as to determine the first associated plug-in and the second component that uses the first associated plug-in; and then, based on the information about the second component and the description information of the first associated plug-in, installs the first associated plug-in onto the device on which the second component is located. According to the associated plug-in management server device in this embodiment, based on the obtaining description information of the associated plug-in and the information about a component that uses the associated plug-in, an installation process of the associated plug-in may be independent of an installation process of the component that uses the associated plug-in, and unified and automated installation of the associated plug-in is implemented, so that deployment of components related to the associated plug-in is no longer dependent on each other, and decoupling during deployment of components related to an associated plug-in is implemented.

Further, the associated plug-in management method provided in this embodiment implements automatic management of the associated plug-ins, such as automatic installation, upgrade and deletion for the associated plug-ins by using the associated plug-in management server device, and decreases problems of the associated plug-ins, such as deployment complexity and error-proneness of the associated plug-ins.

Figure 2:
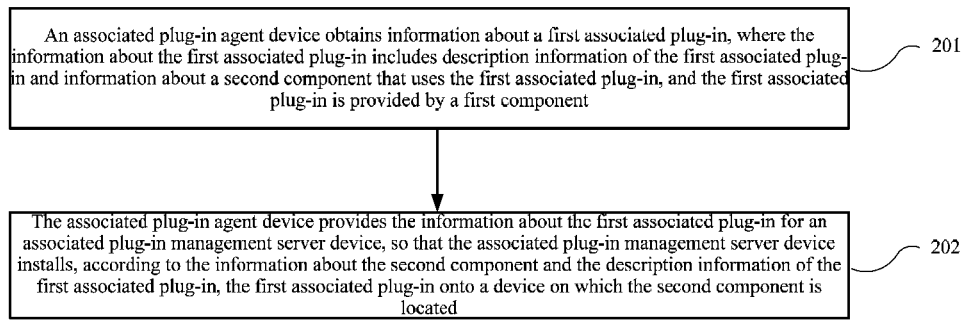
FIG. 2 is a flowchart of another associated plug-in management method according to an embodiment of the present invention.

FIG. 2 is a flowchart of another associated plug-in management method according to an embodiment of the present invention. As shown in FIG. 2, the method includes:

201. An associated plug-in agent device obtains information about a first associated plug-in, where the information about the first associated plug-in is provided by a first component and includes description information of the first associated plug-in and information about a second component that uses the first associated plug-in.

202. The associated plug-in agent device provides the information about the first associated plug-in for an associated plug-in management server device, so that the associated plug-in management server device installs, according to the information about the second component and the description information of the first associated plug-in, the first associated plug-in onto a device on which the second component is located.

The method provided in this embodiment corresponds to the method embodiment shown in FIG. 1, and is described from a perspective of the associated plug-in agent device.

The associated plug-in management method provided in this embodiment primarily involves an associated plug-in management server device and an associated plug-in agent device, and is applicable to an application scenario of distributed deployment of components. The application scenario of distributed deployment of components may be distributed deployment of components in a same application system, or may be distributed deployment of components in different application systems, where the application system may be an alarm system, a network topology system, a security subsystem, and the like. The associated plug-in management server device primarily implements management of an associated plug-in, primarily including installation, upgrade, deletion, distribution and the like of the associated plug-in. The associated plug-in agent device is primarily responsible for registration of components and the like, so as to provide the associated plug-in management server device with information that is about the associated plug-in and is carried by a component.

In actual application, the associated plug-in agent device may obtain the information about the associated plug-in that is provided by a component. An implementation manner of obtaining, by using an associated plug-in proxy device, information about the associated plug-in that is provided by a component includes but is not limited to the following types:

For example, when each component is installed, the component to be installed needs to perform registration of a potential user of the associated plug-in and provides information about the component, where the information provided for registering the component to be installed includes but is not limited to a type of the component to be installed, a version number of the component to be installed, and the like. The type of the component to be installed is mandatory information, and may be formed of a name of the component to be installed, a position of the component, a feature of the component, and the like, and is used to indicate whether the component to be installed is a user or a provider of the associated plug-in.

Further, if the component to be installed is a provider of the associated plug-in, at the time of registration, not only the information about the component to be installed but also the information about the associated plug-in need to be provided. The information about the associated plug-in includes but is not limited to description information of the associated plug-in and information about a user (that is, the component that uses the associated plug-in) of the associated plug-in. For example, the information about the associated plug-in, which is provided by the component to be installed at the time of registration, may further include version compatibility information about the associated plug-in, version compatibility information about the user of the associated plug-in, and the like.

Not only may the component to be installed provide the information about the associated plug-in in a manner of registration, but also an installed component or a component that does not need to be installed currently may provide, in a manner of registration, information that is about the associated plug-in and is provided by the component itself.

In addition, the associated plug-in agent device may also obtain the information that is about the associated plug-in and is provided by each component in another manner other than registration. For example, an administrator or an operator pre-stores the information that is about the associated plug-in and can be provided by each component to a local address of the associated plug-in agent device beforehand.

In this embodiment, for ease of description, the component that provides the associated plug-in is called a first component, and the associated plug-in carried by the first component is called a first associated plug-in, and the user of the first associated plug-in is called a second component. It is hereby specified that the first component involved in this embodiment may be a component to be installed, an installed component, or a component that does not need to be installed currently, which is not limited herein.

For example, it is assumed that the first component is a component to be installed, the first component may register with the associated plug-in agent device mentioned in this embodiment, and provide the information that is about the first associated plug-in that is provided by the first component. In this way, the associated plug-in agent device can learn the information that is about the first associated plug-in that is provided by the first component. It is hereby specified that in a situation in which the first component is a component to be installed, that which specific device the first component is installed on is not limited in this embodiment. For example, the first component may be installed on an associated plug-in management server device, may be installed on an associated plug-in agent device, or may be installed on another device that is different from the associated plug-in management server device and the associated plug-in agent device. The embodiment of the present invention focuses on a situation in which the first component is installed on the associated plug-in management server device or the associated plug-in agent device, a specific process thereof is described in subsequent parts.

In an optional implementation manner, the associated plug-in agent device may provide an associated plug-in registry locally for storing information about the associated plug-in. In this way, the associated plug-in agent device may store the information that is about the first associated plug-in that is provided by the first component into the associated plug-in registry.

After obtaining the information that is about the first associated plug-in that is provided by the first component, the associated plug-in agent device provides the associated plug-in management server device with the information that is about the first associated plug-in that is provided by the first component. For example, the associated plug-in agent device may receive a query request sent by the associated plug-in management server device, query the associated plug-in registry of the associated plug-in agent device according to the query request, and obtain, from the associated plug-in registry, the information about the first associated plug-in that is provided by the first component, and return the information.

In an optional implementation manner, storage management is performed on the associated plug-in by using an associated plug-in warehouse. The associated plug-in warehouse includes a local associated plug-in warehouse that is set on the associated plug-in agent device side and a central associated plug-in warehouse that is set on the associated plug-in management server device side. After obtaining the information about the first associated plug-in that is provided by the first plug-in, the associated plug-in agent device may store the first associated plug-in into the local associated plug-in warehouse on the associated plug-in agent device. Correspondingly, the associated plug-in management server device may further perform synchronization on a central associated plug-in warehouse on the associated plug-in management server device and the local associated plug-in warehouse on the associated plug-in agent device, so as to synchronize the first associated plug-in into the central associated plug-in warehouse on the associated plug-in management server device.

The associated plug-in management server device may poll the central associated plug-in warehouse on the associated plug-in management server device, and discover whether the first associated plug-in is added, and further, after the first associated plug-in is discovered, install, according to the information about the second component and the description information of the first associated plug-in, the first associated plug-in onto the device on which the second component is located. In an optional implementation manner, the device on which the second component is located may be the associated plug-in agent device. Based on this, when discovering that the first associated plug-in is added to the central associated plug-in warehouse on the associated plug-in management server device, the associated plug-in management server device may determine, according to the information about the second component, that the device on which the second component is located is the associated plug-in agent device, determine the first associated plug-in according to the description information of the first associated plug-in, and then send an associated plug-in management instruction to the associated plug-in agent device to instruct the associated plug-in agent device to install the first associated plug-in onto the associated plug-in agent device. Correspondingly, the associated plug-in agent device may receive the associated plug-in management instruction sent by the associated plug-in management server device, where the associated plug-in management instruction is sent by the associated plug-in management server device after determining, according to the information about the second component, that the device on which the second component is located is the associated plug-in agent device and determining the first associated plug-in according to the description information of the first associated plug-in, and the associated plug-in management instruction is used to instruct the associated plug-in agent device to install the first associated plug-in onto the associated plug-in agent device. After receiving the associated plug-in management instruction, the associated plug-in agent device determines the first associated plug-in according to an instruction of the associated plug-in management instruction, and then installs the first associated plug-in onto the associated plug-in agent device. Optionally, after determining the first associated plug-in, the associated plug-in agent device may obtain the first plug-in directly from the local associated plug-in warehouse on the associated plug-in agent device, and then install the first plug-in onto the associated plug-in agent device.

It is hereby specified that a manner of instructing the first associated plug-in by the associated plug-in management server device by means of the associated plug-in management instruction is not limited in this embodiment. For example, the associated plug-in management server device may make the associated plug-in management instruction carry an identifier of the first associated plug-in, so that the associated plug-in agent device may determine the first associated plug-in according to the identifier that is about the first associated plug-in and is carried in the associated plug-in management instruction. For another example, the associated plug-in agent device and the associated plug-in management server device may pre-agree to perform processing according to order of the associated plug-ins, that is, processing another associated plug-in after one associated plug-in is processed. In this way, the associated plug-in agent device may determine, according to the information about the associated plug-in that is provided for the associated plug-in management server device before the associated plug-in management instruction is received, which associated plug-in corresponds to the received associated plug-in management instruction. In the latter manner, the associated plug-in management server device does not need to make the associated plug-in management instruction carry any information, which facilitates to reduce the load of the associated plug-in management server device. In addition, the associated plug-in agent device does not need to perform processing, such as parsing, on the associated plug-in management indication, which also reduces the processing load of the associated plug-in agent device.

Further, on a basis of the central associated plug-in warehouse and the local associated plug-in warehouse, when it is discovered that the first associated plug-in changes, the associated plug-in management server device performs change processing on the first associated plug-in according to the information about the second component and change information of the first associated plug-in, where the change processing for the first associated plug-in includes performing upgrading on the first associated plug-in on the device on which the second component is located or deleting the first associated plug-in on the device on which the second component is located.

Based on the performing upgrade processing on the first associated plug-in, one situation is that: an upgrade package that is corresponding to the first associated plug-in is stored on the associated plug-in agent device, and the associated plug-in agent device may store the upgrade package that is corresponding to the first associated plug-in into the local associated plug-in warehouse on the associated plug-in agent device. Based on this, the associated plug-in management server device synchronizes the upgrade package that is corresponding to the first associated plug-in from the local associated plug-in warehouse on the associated plug-in agent device into the central associated plug-in warehouse on the associated plug-in management server device before upgrading the first associated plug-in, and then upgrades the first associated plug-in according to the upgrade package that is corresponding to the first associated plug-in, that is, obtains the upgrade package that is corresponding to the first associated plug-in from the central associated plug-in warehouse on the associated plug-in management server device and then installs the obtained upgrade package that is corresponding to the first associated plug-in onto the device on which the second component is located.

In an optional implementation manner, not only is storage management performed on the associated plug-in by using an associated plug-in warehouse, but also recycling management is performed on the associated plug-in by using a recycling warehouse of associated plug-ins, where the recycling warehouse of associated plug-ins includes a local associated plug-in recycling warehouse that is set on the associated plug-in agent device side and a central associated plug-in recycling warehouse that is set on the associated plug-in management server device side. Based on this, in a situation in which deletion processing is performed on the first associated plug-in, after deleting the first associated plug-in from the device on which the second component is located, the associated plug-in management server device may further move the first associated plug-in from the central associated plug-in warehouse on the associated plug-in management server device into a central associated plug-in recycling warehouse on the associated plug-in management server device, and control the associated plug-in agent device to move the first associated plug-in from the local associated plug-in warehouse on the associated plug-in agent device into a local associated plug-in recycling warehouse on the associated plug-in agent device. Correspondingly, after the first associated plug-in is deleted from the device on which the second component is located, the associated plug-in agent device may move, under control of the associated plug-in management server device, the first associated plug-in from the local associated plug-in warehouse on the associated plug-in agent device into the local associated plug-in recycling warehouse on the associated plug-in agent device. For example, the associated plug-in agent device may receive a removal instruction sent by the associated plug-in management server device, and move, according to the removal instruction, the first associated plug-in from the local associated plug-in warehouse on the associated plug-in agent device into the local associated plug-in recycling warehouse on the associated plug-in agent device. However, this implementation manner is not construed as a limitation. The removal instruction is used to indicate removal of the first associated plug-in from the local associated plug-in warehouse on the associated plug-in agent device into the local associated plug-in recycling warehouse on the associated plug-in agent device. However, the specific instruction manner is not limited.

In an optional implementation manner, in a situation in which the first component is a component to be installed, the first component needs to be installed on the associated plug-in management server device. Based on this, the associated plug-in management method provided in this embodiment further includes: obtaining, by the associated plug-in agent device, information about the first component, and providing the information about the first component for the associated plug-in management server device, so that the associated plug-in management server device installs the first component onto the associated plug-in management server device according to the information about the first component.

It is hereby specified that the providing, by the associated plug-in agent device, the information about the first component for the associated plug-in management server device and providing, by the associated plug-in agent device, the information about the first associated plug-in that is provided by the first component for the associated plug-in management server device may be completed in a same process and may also be completed in different processes.

In an optional implementation manner, in a situation in which the first component is a component to be installed, the first component needs to be installed on the associated plug-in agent device. Based on this, the associated plug-in management method provided in this embodiment further includes: obtaining, by the associated plug-in agent device, information about the first component, and installing the first component onto the associated plug-in agent device according to the information about the first component.

In conclusion, in this embodiment, the associated plug-in agent device cooperates with the associated plug-in management server device, and the description information of the first associated plug-in and the information about the second component that uses the first associated plug-in, which are provided by the first component, are provided for the associated plug-in management server device. Therefore, the associated plug-in management server device can install, according to the description information of the first associated plug-in and the information about the second component that uses the first associated plug-in, the first associated plug-in onto the device on which the second component is located, where an installation process of the associated plug-in is independent of an installation process of a component that uses the associated plug-in, thereby implementing unified and automated installation of the associated plug-in. As a result, deployment of components related to the associated plug-in is no longer dependent on each other, and decoupling during deployment of components related to an associated plug-in is implemented.

Figure 3:
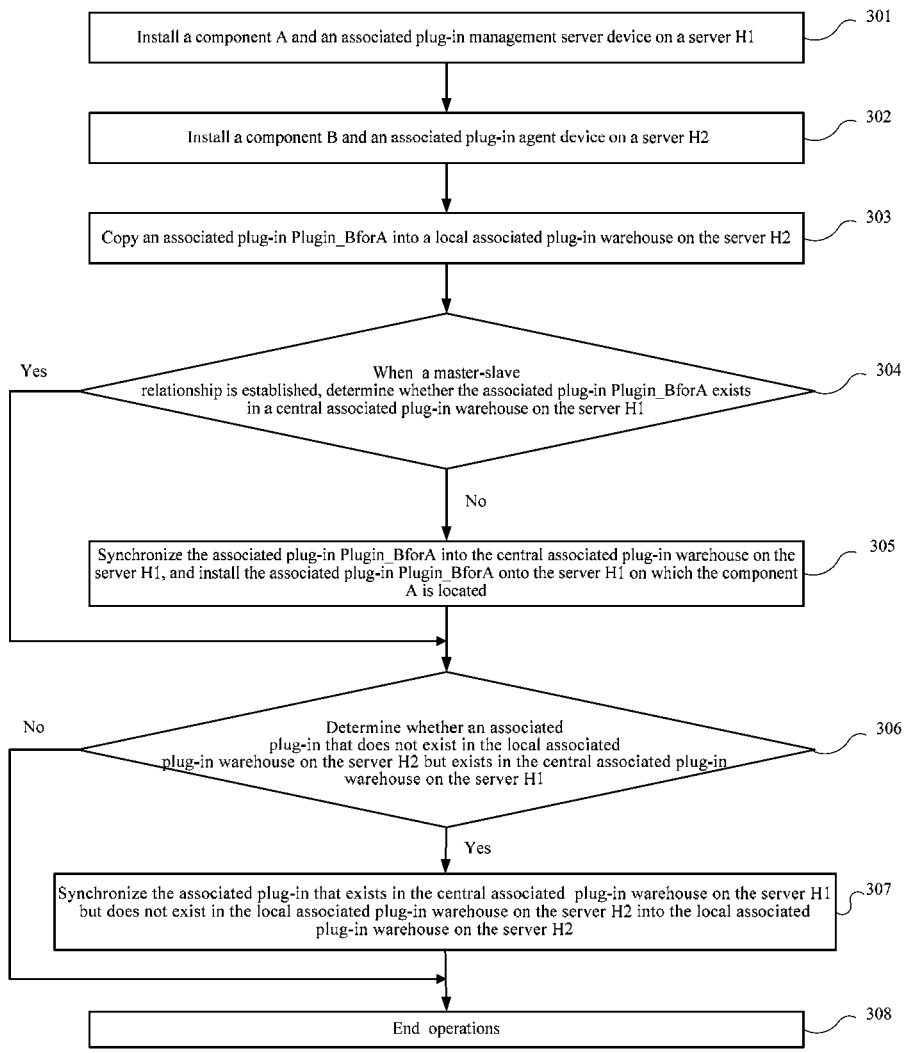
FIG. 3 is a flowchart of still another associated plug-in management method according to an embodiment of the present invention.

An actual application scenario is: A distributed system is deployed on two machines, where the distributed system includes components A and B, an associated plug-in Plugin_BforA of the component A exists on the component B, the component A is deployed on a server H1, the component B is deployed on a server H2, the associated plug-in Plugin_BforA needs to be deployed on the H1 synchronously, and the associated plug-in management server device in the foregoing embodiment is deployed on the server H1. It is hereby specified that the component A herein is equivalent to the second component in the foregoing embodiment, the component B is equivalent to the first component in the foregoing embodiment, and the associated plug-in Plugin_BforA is equivalent to the first associated plug-in in the foregoing embodiment. In this application scenario, the second component is installed on the associated plug-in management server device, and the first component is installed on the associated plug-in agent device. To ensure no perception of a distributed manner when the components are deployed locally, synchronization of the associated plug-in is performed only when the associated plug-in management server device is added as a server H2 of a slave machine. As shown in FIG. 3, a procedure of adding the server H2 includes:

301. Install the component A and the associated plug-in management server device on the server H1.

302. Install the component B and the associated plug-in agent device on the server H2.

303. Copy the associated plug-in Plugin_BforA into a local associated plug-in warehouse on the server H2.

304. When a master-slave relationship is established, determine whether the associated plug-in Plugin_BforA exists in the central associated plug-in warehouse on the server H1; and if a determining result is no, perform step 305; or, if the determining result is yes, perform step 306.

305. Synchronize the associated plug-in Plugin_BforA into the central associated plug-in warehouse on the server H1, install the associated plug-in Plugin_BforA onto the server H1 on which the component A is located, and perform step 306.

306. Determine whether an associated plug-in that does not exist in the local associated plug-in warehouse on the server H2 exists in the central associated plug-in warehouse on the server H1; and if a determining result is yes, perform step 307; or, if the determining result is no, perform step 308.

307. Synchronize the associated plug-in into the local associated plug-in warehouse on the server H2, where the associated plug-in exists in the central associated plug-in warehouse on the server H1 but does not exist in the local associated plug-in warehouse on the server H2, and perform 308.

308. End operations.

Figure 4:
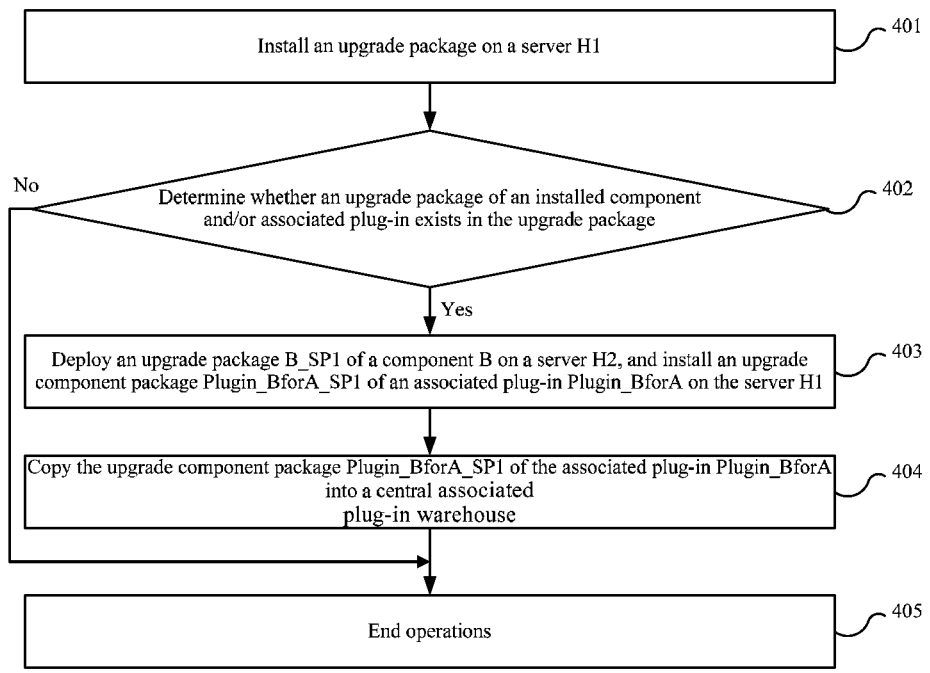
FIG. 4 is a flowchart of yet another associated plug-in management method according to an embodiment of the present invention.
Figure 5:
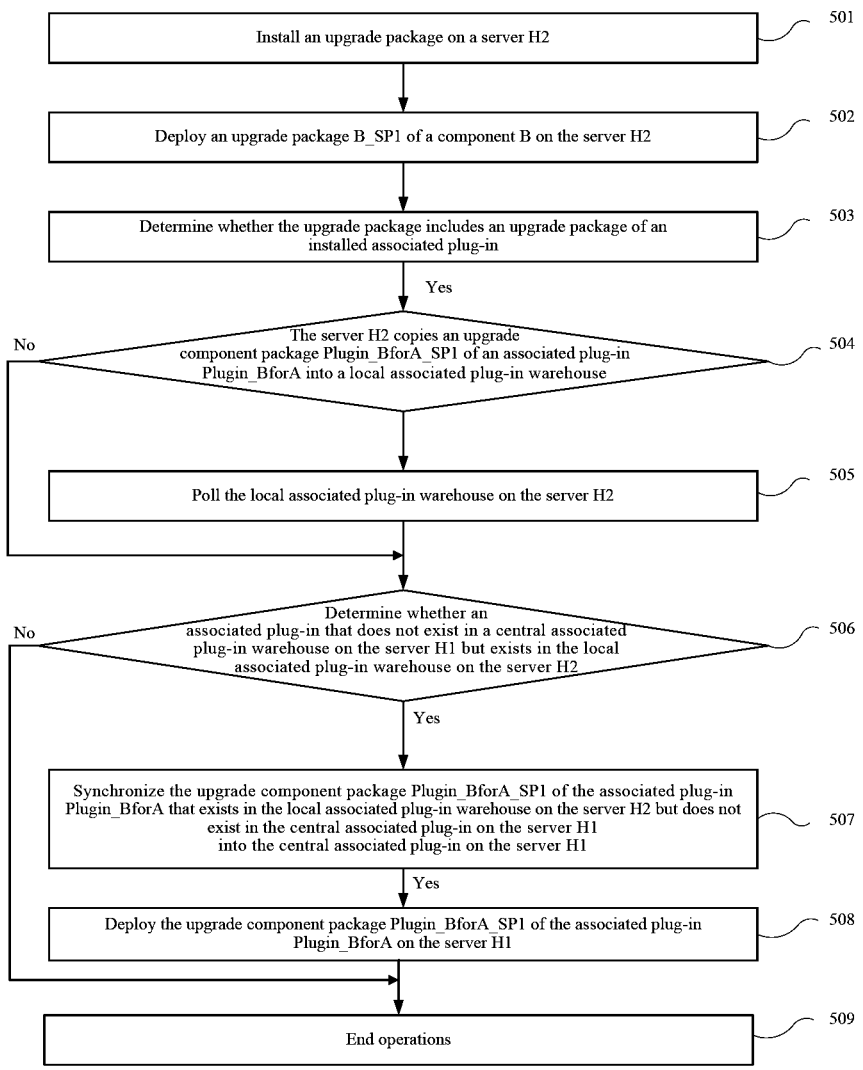
FIG. 5 is a flowchart of yet another associated plug-in management method according to an embodiment of the present invention.

Further, assuming that the components and the associated plug-in need to be upgraded, and based on the foregoing description, assuming that an upgrade package includes an upgrade component package B_SP1 of the component B and an upgrade component package Plugin_BforA_SP1 of the associated plug-in Plugin_BforA, upgrade procedures on the server H1 and the server H2 are shown in FIG. 4 and FIG. 5 respectively.

As shown in FIG. 4, the upgrade procedure on the server H1 includes:

401. Install an upgrade package on the server H1.

402. Determine whether an upgrade package of an installed component and/or associated plug-in exists in the upgrade package; and if a determining result is yes, perform step 403; or, if the determining result is no, perform step 405.

In this embodiment, it is assumed that the upgrade package includes the upgrade package of the component B.

403. Deploy the upgrade package B_SP1 of the component B on the server H2, and install the upgrade component package Plugin_BforA_SP1 of the associated plug-in Plugin_BforA on the server H1.

404. Copy the upgrade component package Plugin_BforA_SP1 of the associated plug-in Plugin_BforA into the central associated plug-in warehouse, and perform step 405.

405. End operations.

As shown in FIG. 5, the upgrade procedure on the server H2 includes:

501. Install an upgrade package on the server H2.

502. Deploy the upgrade package B_SP1 of the component B on the server H2.

503. Determine whether the upgrade package includes an upgrade package of an installed associated plug-in; and if a determining result is yes, perform step 504; or, if the determining result is no, perform step 505.

In this embodiment, it is assumed that the upgrade package includes the upgrade component package Plugin_BforA_SP1 of the associated plug-in Plugin_BforA.

504. The server H2 copies the upgrade component package Plugin_BforA_SP1 of the associated plug-in Plugin_BforA into the local associated plug-in warehouse, and performs step 505.

505. Poll the local associated plug-in warehouse on the server H2.

506. Determine whether an associated plug-in that does not exist in the central associated plug-in warehouse on the server H1 exists in the local associated plug-in warehouse on the server H2; and if a determining result is yes, perform step 507; or, if the determining result is no, perform step 509.

507. Synchronize the upgrade component package Plugin_BforA_SP1 of the associated plug-in Plugin_BforA into the central associated plug-in warehouse on the server H1, where the associated plug-in Plugin_BforA exists in the local associated plug-in warehouse on the server H2 but does not exist in the central associated plug-in warehouse on the server H1, and perform step 508.

508. Deploy the upgrade component package Plugin_BforA_SP1 of the associated plug-in Plugin_BforA on the server H1, and perform step 509.

509. End operations.

Figure 6:
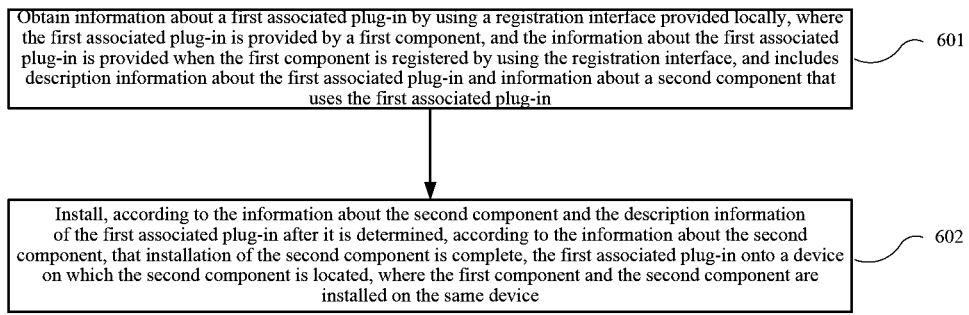
FIG. 6 is a flowchart of yet another associated plug-in management method according to an embodiment of the present invention.

FIG. 6 is a flowchart of yet another associated plug-in management method according to an embodiment of the present invention. As shown in FIG. 6, the method includes:

601. Obtain information about a first associated plug-in by using a registration interface provided locally, where the first associated plug-in is provided by a first component, and the information about the first associated plug-in is provided when the first component is registered by using the registration interface, and includes description information of the first associated plug-in and information about a second component that uses the first associated plug-in.

602. Install, after it is determined, according to the information about the second component, that installation of the second component is complete, according to the information about the second component and the description information of the first associated plug-in, the first associated plug-in onto a device on which the second component is located, where the first component and the second component are installed on the same device.

To solve a problem of mutual dependence and close coupling during deployment of components related to an associated plug-in in the prior art, the embodiment provides an associated plug-in management method. The associated plug-in management method provided in the embodiment of the present invention is applicable to an application scenario of single-point deployment, that is, applicable to an application scenario in which related components are deployed on the same device. For example, this embodiment may be executed by an associated plug-in management device, that is, a device on which the first component and the second component are located, which means that both the first component and the second component are installed on the associated plug-in management device. The associated plug-in management device in this embodiment is different from the associated plug-in management server device and the associated plug-in agent device in the foregoing embodiment. In this embodiment, the associated plug-in management device is used to implement unified and automated installation of the associated plug-in. In this way, deployment of components related to the associated plug-in is no longer dependent on each other, and decoupling during deployment of components related to an associated plug-in is implemented.

In this embodiment, the associated plug-in management device provides a registration function for each component, and specifically provides a registration interface. Based on this, each component may register with the associated plug-in management device by using the registration interface, and provides information about the component itself. The information provided for registering the component includes but is not limited to a type of the component, a version number of the component, and the like. The type of the component is mandatory information, and may be formed by a name of the component, a position of the component, a feature of the component, and the like, and may indicate whether the component is a user or a provider of the associated plug-in.

Further, if the component is a provider of the associated plug-in, at the time of registration, not only the information about the component but also the information about the associated plug-in need to be provided. The information about the associated plug-in includes but is not limited to description information of the associated plug-in and information about a user (that is, the component that uses the associated plug-in) of the associated plug-in. For example, the information about the associated plug-in that is provided by the component at the time of registration may further include version compatibility information about the associated plug-in, version compatibility information about the user of the associated plug-in, and the like.

It is hereby specified that the registration function provided by the associated plug-in management device in this embodiment not only allows registration of a component to be installed, but also allows registration of an installed component or a component that does not need to be installed currently. That is, the component may be a component to be installed, an installed component, or a component that does not need to be installed currently, or the like.

In this embodiment, for ease of description, the component that provides the associated plug-in is called a first component, and the associated plug-in provided by the first component is called a first associated plug-in, and the user of the first associated plug-in is called a second component. It is hereby specified that the first component involved in this embodiment may be a component to be installed, an installed component, or a component that does not need to be installed currently, which is not limited herein.

After obtaining description information of the first associated plug-in and the information about the second component that uses the first associated plug-in and after determining, according to the information about the second component, that installation of the second component is complete, the associated plug-in management device installs, according to information about the second component and the description information of the first associated plug-in, the first associated plug-in onto a device on which the second component is located.

In this embodiment, the associated plug-in management device may obtain, by using the registration interface, the description information of the first associated plug-in that is provided by the first component and the information about the second component that uses the first associated plug-in, and may further, based on the obtained information, separately perform processing on installation of the first associated plug-in used by the second component. In this way, the installation of the second component is independent of the installation of the first associated plug-in used by the second component, so that loose coupling during deployment of components related to an associated plug-in is implemented.

In an optional implementation manner, storage management is performed on associated plug-ins by using an associated plug-in warehouse, and storage management is performed on related information about components and associated plug-ins by using an associated plug-in registry. In this embodiment, the associated plug-in warehouse and the associated plug-in registry may be set on the associated plug-in management device locally, or may be set on another device that is far away from the associated plug-in management device.

Based on this, the method provided in this embodiment further includes: storing the first associated plug-in into the associated plug-in warehouse to perform centralized management on all associated plug-ins; and storing the information about the first associated plug-in that is provided by the first component into the associated plug-in registry, so as to perform centralized management on information about all the associated plug-ins.

Based on the foregoing description, a specific implementation manner of step 602 includes: polling the associated plug-in warehouse, and when it is discovered that the first associated plug-in is added to the associated plug-in warehouse, installing, according to the information about the second component and the description information of the first associated plug-in, the first associated plug-in onto the device on which the second component is located.

Further, on a basis of the associated plug-in warehouse, the associated plug-in management method provided in this embodiment further includes: performing change processing on the first associated plug-in according to the information about the second component and change information of the first associated plug-in when the first associated plug-in changes, where the change processing for the first associated plug-in includes performing upgrading on the first associated plug-in on the device on which the second component is located or deleting the first associated plug-in on the device on which the second component is located.

It is hereby specified that the associated plug-in management device may learn whether the first associated plug-in changes. For example, when a component and/or an associated plug-in need to be upgraded, an administrator may install an upgrade package that is corresponding to the related component and/or associated plug-in onto the associated plug-in management device. In this way, the associated plug-in management device can learn, by determining, whether the first associated plug-in needs to be upgraded. For another example, when a component and/or an associated plug-in need to be deleted, the associated plug-in management device may receive a related deletion instruction, and can learn, by determining, whether the first associated plug-in needs to be deleted from the device on which the second component is located.

If the change processing for the first associated plug-in is performing upgrading on the first associated plug-in on the device on which the second component is located, the change information of the first associated plug-in includes an upgrade package corresponding to the first associated plug-in. Based on this, the method provided in this embodiment further includes: storing the change information of the first associated plug-in into the associated plug-in warehouse after performing upgrading on the first associated plug-in, where the change information includes the upgrade package that is corresponding to the first associated plug-in.

In an optional implementation manner, not only is storage management performed on the associated plug-ins by using the associated plug-in warehouse, but also recycling management is performed on the associated plug-ins by using a recycling warehouse of associated plug-ins. Based on this, in a situation in which deletion processing is performed on the first associated plug-in, after the first associated plug-in is deleted from the device on which the second component is located, the first associated plug-in may be further moved from the associated plug-in warehouse into the recycling warehouse of associated plug-ins. The recycling warehouse of associated plug-ins may be set on the associated plug-in management device locally, or may be set on another device that is far away from the associated plug-in management device.

In an optional implementation manner, in a situation in which the first component is a component to be installed, the first component needs to be installed on the associated plug-in management device. Based on this, the associated plug-in management method provided in this embodiment further includes: obtaining, by the associated plug-in management device, information about the first component that is provided when the first component is registered by using the registration interface, and installing, according to the information about the first component, the first component onto the associated plug-in management device.

It is hereby specified that the obtaining, by the associated plug-in management device, the information about the first component by using the registration interface and obtaining, by the associated plug-in management device, the information about the first associated plug-in that is provided by the first component by using the registration interface may be completed in a same process and may also be completed in different processes.

Further, optionally, the associated plug-in management device may further store the information about the first component into the associated plug-in registry to perform centralized management on information about all components.

As can be seen from the foregoing description, according to the associated plug-in management method provided in this embodiment, a registration interface is provided to obtain description information of a first associated plug-in that is provided by a first component and information about a second component that uses the first associated plug-in, where the description information of the first associated plug-in and the information about the second component are provided when the first component is registered, so as to determine the first associated plug-in and the second component that uses the first associated plug-in; and then, based on the information about the second component and the description information of the first associated plug-in, the first associated plug-in is installed onto a device on which the second component is located. According to the associated plug-in management device in this embodiment, based on the obtaining description information of the associated plug-in and the information about a component that uses the associated plug-in, an installation process of the associated plug-in may be independent of an installation process of the component that uses the associated plug-in, and unified and automated installation of the associated plug-in is implemented, so that deployment of components related to the associated plug-in is no longer dependent on each other, and decoupling during deployment of components related to an associated plug-in is implemented.

Figure 7:
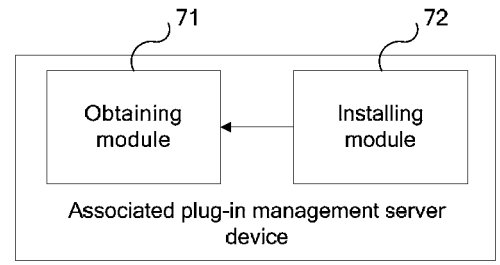
FIG. 7 is a schematic structural diagram of an associated plug-in management server device according to an embodiment of the present invention.

FIG. 7 is a schematic structural diagram of an associated plug-in management server device according to an embodiment of the present invention. As shown in FIG. 7, the device includes an obtaining module 71 and an installing module 72.

The obtaining module 71 is configured to obtain information about a first associated plug-in by using an associated plug-in agent device, where the information about the first associated plug-in includes description information of the first associated plug-in and information about a second component that uses the first associated plug-in, and the first associated plug-in is provided by a first component.

The installing module 72 is connected to the obtaining module 71, and is configured to: after it is determined, according to the information that is about the second component and is obtained by the obtaining module 71, that installation of the second component is complete, install, according to the information that is about the second component and is obtained by the obtaining module 71 and the description information of the first associated plug-in, the first associated plug-in onto a device on which the second component is located.

It is hereby specified that the first component involved in this embodiment may be a component to be installed, an installed component, or a component that does not need to be installed currently, which is not limited herein.

It is hereby specified that, the device on which the second component is located may be the associated plug-in management server device, may be the associated plug-in agent device, or may be another device that is different from the associated plug-in management server device and the associated plug-in agent device. The embodiment of the present invention focuses on a situation in which the device on which the second component is located is the associated plug-in management server device or the associated plug-in agent device.

Figure 8:
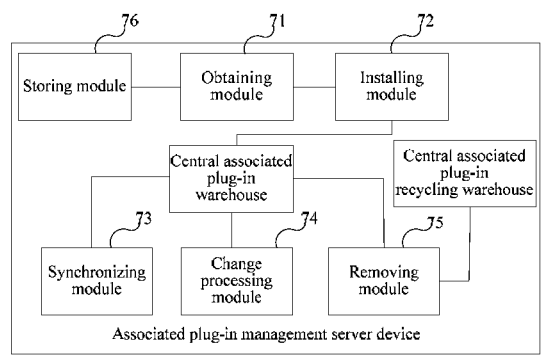
FIG. 8 is a schematic structural diagram of another associated plug-in management server device according to an embodiment of the present invention.

In an optional implementation manner, as shown in FIG. 8, the associated plug-in management server device further includes a synchronizing module 73.

The synchronizing module 73 is configured to: when the first associated plug-in is stored in a local associated plug-in warehouse on the associated plug-in agent device, perform synchronization on a central associated plug-in warehouse on the associated plug-in management server device and the local associated plug-in warehouse on the associated plug-in agent device, so as to synchronize the first associated plug-in into the central associated plug-in warehouse on the associated plug-in management server device.

Based on the foregoing description, the installing module 72 may be specifically configured to poll the central associated plug-in warehouse on the associated plug-in management server device, and when it is discovered that the first associated plug-in is added to the central associated plug-in warehouse on the associated plug-in management server device, install, according to the information about the second component and the description information of the first associated plug-in, the first associated plug-in onto the device on which the second component is located.

In an optional implementation manner, as shown in FIG. 8, the associated plug-in management server device further includes a change processing module 74.

The change processing module 74 is configured to perform change processing on the first associated plug-in according to the information about the second component and change information of the first associated plug-in when the first associated plug-in changes, where the change processing for the first associated plug-in includes performing upgrading on the first associated plug-in on the device on which the second component is located or deleting the first associated plug-in on the device on which the second component is located.

Further, optionally, if the change processing for the first associated plug-in is performing upgrading on the first associated plug-in on the device on which the second component is located, the change processing module 74 is further configured to output the change information of the first associated plug-in, where the change information of the first associated plug-in includes an upgrade package that is corresponding to the first associated plug-in.

In one situation, the upgrade package that is corresponding to the first associated plug-in is installed on the associated plug-in management server device, so that the change processing module 74 may upgrade the first associated plug-in directly according to the upgrade package that is corresponding to the first associated plug-in. Based on this, the change processing module 74 is further configured to: after the first associated plug-in is upgraded, store the change information of the first associated plug-in into the central associated plug-in warehouse on the associated plug-in management server device, where the change information includes the upgrade package that is corresponding to the first associated plug-in.

In another situation, the upgrade package that is corresponding to the first associated plug-in is installed on the associated plug-in agent device, so that the synchronizing module 73 is further configured to synchronize the upgrade package that is corresponding to the first associated plug-in from the local associated plug-in warehouse on the associated plug-in agent device into the central associated plug-in warehouse on the associated plug-in management server device before the change processing module 74 upgrades the first associated plug-in, so as to provide the upgrade package that is corresponding to the first associated plug-in for the change processing module 74.

In an optional implementation manner, as shown in FIG. 8, the associated plug-in management server device further includes a removing module 75.

The removing module 75 is configured to: if the change processing for the first associated plug-in is deleting the first associated plug-in from the device on which the second component is located, after the change processing module 74 deletes the first associated plug-in from the device on which the second component is located, move the first associated plug-in from the central associated plug-in warehouse on the associated plug-in management server device into a central associated plug-in recycling warehouse on the associated plug-in management server device, and control the associated plug-in agent device to move the first associated plug-in from the local associated plug-in warehouse on the associated plug-in agent device into a local associated plug-in recycling warehouse on the associated plug-in agent device.

Further, optionally, the synchronizing module 73 is further configured to synchronize a second associated plug-in into the local associated plug-in warehouse on the associated plug-in agent device, where the second associated plug-in exists in the central associated plug-in warehouse on the associated plug-in management server device but does not exist in the local associated plug-in warehouse on the associated plug-in agent device. Correspondingly, the installing module 72 is further configured to install, according to description information of the second associated plug-in and information about a third component that uses the second associated plug-in, the second associated plug-in onto a device on which the third component is located.

In an optional implementation manner, the device on which the second component is located is the associated plug-in agent device. Based on this, the installing module 72 may be specifically configured to determine, according to the information about the second component, that the device on which the second component is located is the associated plug-in agent device, determine the first associated plug-in according to the description information of the first associated plug-in, and send an associated plug-in management instruction to the associated plug-in agent device to instruct the associated plug-in agent device to install the first associated plug-in onto the associated plug-in agent device.

In an optional implementation manner, as shown in FIG. 8, the associated plug-in management server device further includes a storing module 76.

The storing module 76 is configured to store an associated plug-in registry, where the information about the first associated plug-in that is provided by the first component is recorded in the associated plug-in registry, so that the associated plug-in management server device performs centralized management on information about all associated plug-ins. The storing module 76 is connected to the obtaining module 71, and is configured to store the information of the first associated plug-in that is provided by the first component, where the information about the first associated plug-in is obtained by the obtaining module 71.

In an optional implementation manner, the obtaining module 71 may be specifically configured to send a query request to the associated plug-in agent device and receive the information about the first associated plug-in that is provided by the first component, where the information about the first associated plug-in is returned by the associated plug-in agent device in response to the query request, and the information about the first associated plug-in that is provided by the first component is obtained by the associated plug-in agent device by querying the associated plug-in registry on the associated plug-in agent device, and returned.

In an optional implementation manner, the first component is a component to be installed and needs to be installed on the associated plug-in management server device. Based on this, the obtaining module 71 may be further configured to obtain information about the first component by using the associated plug-in agent device. Correspondingly, the installing module 72 may be further configured to install the first component onto the associated plug-in management server device according to the information about the first component.

Further, the associated plug-in registry stored by the storing module 76 may be further used to record the information about the first component, so that the associated plug-in management server device performs centralized management on information about all components.

It is hereby specified that, as shown in FIG. 8, the associated plug-in management server device further includes a central associated plug-in warehouse and a central associated plug-in recycling warehouse, where the central associated plug-in warehouse is configured to store associated plug-ins, and the central associated plug-in recycling warehouse is configured to store a deleted associated plug-in. Connection relationships between the central associated plug-in warehouse and the central associated plug-in recycling warehouse and each module are shown in FIG. 8.

The associated plug-in management server device provided in this embodiment may be used to perform a procedure in the method embodiment shown in FIG. 1, and its detailed working principle is not repeated herein. For details, reference may be made to the description of the method embodiment.

The associated plug-in management server device provided in this embodiment obtains, by using an associated plug-in agent device, description information of a first associated plug-in and information about a second component that uses the associated plug-in, where the description information of the first associated plug-in and the information about the second component are provided by a first component, so as to determine the first associated plug-in and the second component that uses the first associated plug-in; and then, based on the information about the second component and the description information of the first associated plug-in, installs the first associated plug-in onto a device on which the second component is located. According to the associated plug-in management server device in this embodiment, based on the that description information of the associated plug-in and the information about a component that uses the associated plug-in are obtained, an installation process of the associated plug-in may be independent of an installation process of the component that uses the associated plug-in, and unified and automated installation of the associated plug-in is implemented, so that deployment of components related to the associated plug-in is no longer dependent on each other, and decoupling during deployment of components related to an associated plug-in is implemented.

Further, the associated plug-in management server device provided in this embodiment implements automatic management of the associated plug-ins, such as automatic installation, upgrade and deletion, and decreases problems of the associated plug-ins, such as deployment complexity and error-proneness.

Figure 9:
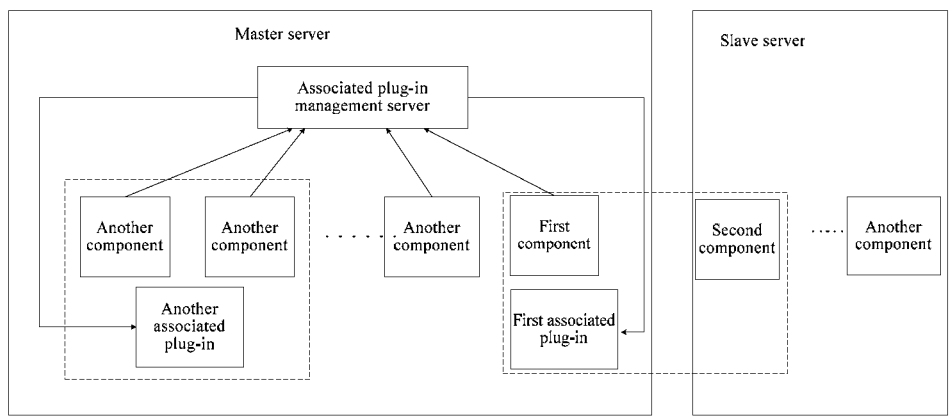
FIG. 9 is a schematic structural diagram of a master server according to an embodiment of the present invention.

FIG. 9 is a schematic structural diagram of a master server according to an embodiment of the present invention. The master server is communicatively connected to at least one slave server, and at least one component is deployed on each of the master server and the slave server, a first component and a second component are included in all components deployed on the master server and the slave server, and a first associated plug-in exists between the first component and the second component. It is hereby specified that, that a first component and a second component are included in all components deployed on the master server and the slave server includes the following situations: the first component is deployed on the master server, and the second component is deployed on the slave server; or, the first component is deployed on the slave server, and the second component is deployed on the master server; or, both the first component and the second component are deployed on the master server; or, both the first component and the second component are deployed on the slave server. For ease of illustration, in FIG. 9, that the first component and the second component are located on the master server and the slave server respectively is used as an example, and components other than the first component and the second component are shown as other components, and associated plug-ins other than the first associated plug-in are shown as other associated plug-ins. As shown in FIG. 9, the master server further includes an associated plug-in management server, where the associated plug-in management server may be an associated plug-in management server device provided in the embodiment shown in FIG. 7 or FIG. 8. An implementation structure and a working principle of the associated plug-in management server device are not repeated herein. For details, reference may be made to the description in the foregoing embodiments.

A master server provided in this embodiment, by using an associated plug-in agent, obtains description information of a first associated plug-in and information about a second component that uses the associated plug-in, where the description information of the first associated plug-in and the information about the second component are provided by a first component, so as to determine the first associated plug-in and the second component that uses the first associated plug-in, and then, based on the information about the second component and the description information of the first associated plug-in, installs the first associated plug-in onto a device on which the second component is located. According to the master server provided in this embodiment, based on the obtaining description information about the associated plug-in and the information about a component that uses the associated plug-in, an installation process of the associated plug-in may be independent of an installation process of the component that uses the associated plug-in, and unified and automated installation of the associated plug-in is implemented, so that deployment of components related to the associated plug-in is no longer dependent on each other, and decoupling during deployment of components related to an associated plug-in is implemented.

Further, the master server provided in this embodiment implements automatic management of the associated plug-ins, such as automatic installation, upgrade and deletion, and decreases problems of the associated plug-ins, such as deployment complexity and error-proneness.

Figure 10:
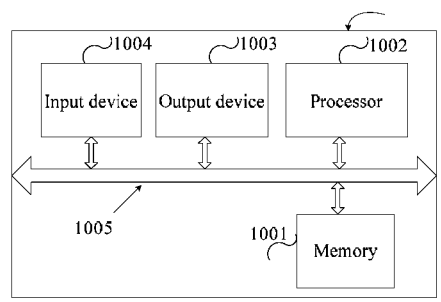
FIG. 10 is a schematic structural diagram of another master server according to an embodiment of the present invention.

FIG. 10 is a schematic structural diagram of another master server according to an embodiment of the present invention. The master server is communicatively connected to at least one slave server, and at least one component is deployed on each of the master server and the slave server, a first component and a second component are included in all components deployed on the master server and the slave server, and a first associated plug-in exists between the first component and the second component. It is hereby specified that, that a first component and a second component are included in all components deployed on the master server and the slave server herein includes the following situations: the first component is deployed on the master server, and the second component is deployed on the slave server; or, the first component is deployed on the slave server, and the second component is deployed on the master server; or, both the first component and the second component are deployed on the master server; or, both the first component and the second component are deployed on the slave server. As shown in FIG. 10, the master server 100 further includes a memory 1001 and a processor 1002.

The memory 1001 may include a read-only memory and a random access memory, and provide an instruction and data for the processor 1002. A part of the memory 1001 may further include a non-volatile random access memory (NVRAM).

The memory 1001 stores the following elements, an executable module or a data structure, or a subset thereof, or an extended set thereof:

operation instructions, including various operation instructions and used to implement various operations; and an operating system, including various system programs, and configured to implement various basic services and handle hardware-based tasks.

In the embodiment of the present invention, the processor 1002 performs the following operations by invoking an operation instruction stored in the memory 1001 (the operation instruction may be stored in an operating system):

obtaining information about a first associated plug-in by using the slave server, where the information about the first associated plug-in includes description information of the first associated plug-in and information about a second component that uses the first associated plug-in, and the first associated plug-in is provided by a first component; and installing, after it is determined, according to the information about the second component, that installation of the second component is complete, according to the information about the second component and the description information of the first associated plug-in, the first associated plug-in onto a device on which the second component is located.

It is hereby specified that the first component involved in this embodiment may be a component to be installed, an installed component, or a component that does not need to be installed currently, which is not limited herein.

It is hereby specified that, the device on which the second component is located may be the master server 100, may be the slave server, or may be another device that is different from the master server 100 and the slave server. The embodiment of the present invention focuses on a situation in which the device on which the second component is located is the master server 100 or the slave server.

In this embodiment, the processor 1002, by using the slave server, obtains the description information of the first associated plug-in and the information about the second component that uses the associated plug-in, which are provided by the first component, so as to determine the first associated plug-in and the second component that uses the first associated plug-in; and then, based on the information about the second component and the description information of the first associated plug-in, installs the first associated plug-in onto the device on which the second component is located. Based on the obtaining description information of the associated plug-in and information about a component that uses the associated plug-in, an installation process of the associated plug-in may be independent of an installation process of the component that uses the associated plug-in, and unified and automated installation of the associated plug-in is implemented, so that deployment of components related to the associated plug-in is no longer dependent on each other, and decoupling during deployment of components related to an associated plug-in is implemented.

The processor 1002 may also be called a central processing unit (Central Processing Unit, CPU for short). The memory

1001 may include a read-only memory and a random access memory, and provide an instruction and data for the processor 1002. A part of the memory 1001 may further include a non-volatile random access memory (NVRAM). In a specific application, all components of the master server 100 are coupled together by using a bus system 1005, where the bus system 1005 includes a power bus, a control bus, a state signal bus, and the like in addition to a data bus. However, for clear description, all buses in the diagram are denoted by the bus system 1005.

The method disclosed in the embodiment shown in FIG. 1, FIG. 3, or FIG. 4 may be applied to the processor 1002, or may be implemented by the processor 1002. The processor 1002 may be an integrated circuit chip capable of processing signals. In an implementation process, the steps of the foregoing method may be performed by using an integrated logical circuit of hardware in the processor 1002 or by means of an instruction in a form of software. The processor 1002 may be a universal processor, a digital signal processor (DSP), an application-specific integrated circuit (ASIC), a field programmable gate array (FPGA) or another programmable logical device, a discrete gate or a transistor logical device, or a discrete hardware assembly. The universal processor may be a microprocessor or the processor may also be any conventional processor. The steps of the method disclosed in the embodiment shown in FIG. 1, FIG. 3, or FIG. 5 may be directly performed by a hardware decoding processor or performed by a combination of hardware and software modules in the decoding processor. The software modules may be located in a mature storage medium in the art, such as a random access memory, a flash memory, a read-only memory, a programmable read-only memory or an electrically erasable programmable memory, or a register. The storage medium is located in the memory 1001; the processor 1002 reads information in the memory 1001, and completes the steps of the method shown in FIG. 1, FIG. 3, or FIG. 5 in combination with hardware of the processor 1002.

Optionally, a part of the memory 1001 may also be used as a central associated plug-in warehouse on the master server 100 and used to store associated plug-ins. Based on this, the processor 1002 may also perform synchronization, when the first associated plug-in is stored in a local associated plug-in warehouse on the slave server, on the central associated plug-in warehouse on the master server 100 and the local associated plug-in warehouse on the slave server, so as to synchronize the first associated plug-in into the central associated plug-in warehouse on the master server 100.

Optionally, the processor 1002 is specifically configured to poll the central associated plug-in warehouse on the master server 100, and when it is discovered that the first associated plug-in is added to the central associated plug-in warehouse on the master server 100, install, according to the information about the second component and the description information of the first associated plug-in, the first associated plug-in onto the device on which the second component is located.

Optionally, the processor 1002 may also perform change processing on the first associated plug-in according to the information about the second component and change information of the first associated plug-in when the first associated plug-in changes, where the change processing for the first associated plug-in includes performing upgrading on the first associated plug-in on the device on which the second component is located or deleting the first associated plug-in on the device on which the second component is located.

Optionally, if the change processing for the first associated plug-in is performing upgrading on the first associated plug-in on the device on which the second component is located, the processor 1002 is further configured to output the change information of the first associated plug-in, where the change information of the first associated plug-in includes an upgrade package that is corresponding to the first associated plug-in.

In one situation, the upgrade package that is corresponding to the first associated plug-in is installed on the master server 100, and therefore, the processor 1002 may upgrade the first associated plug-in directly according to the upgrade package that is corresponding to the first associated plug-in. Based on this, the processor 1002 is further configured to store the change information of the first associated plug-in into the central associated plug-in warehouse on the master server 100 after performing upgrading on the first associated plug-in, where the change information includes the upgrade package that is corresponding to the first associated plug-in.

In another situation, the upgrade package that is corresponding to the first associated plug-in is installed on the slave server, and therefore, the processor 1002 is further configured to synchronize the upgrade package that is corresponding to the first associated plug-in from the local associated plug-in warehouse on the slave server into the central associated plug-in warehouse on the master server 100 before upgrading the first associated plug-in, and then upgrade the first associated plug-in according to the upgrade package that is corresponding to the first associated plug-in.

Further, optionally, a part of the memory 1001 may also be used as a central cycling warehouse of associated plug-ins on the master server 100 and used to store a deleted associated plug-in. Based on this, the processor 1002 is further configured to: if the change processing for the first associated plug-in is the deleting the first associated plug-in from the device on which the second component is located, after the first associated plug-in is deleted from the device on which the second component is located, move the first associated plug-in from the central associated plug-in warehouse on the master server 100 into a central associated plug-in recycling warehouse on the master server 100, and control the slave server to move the first associated plug-in from the local associated plug-in warehouse on the slave server into a local associated plug-in recycling warehouse on the slave server.

Optionally, the processor 1002 may not only synchronize the first associated plug-in from the local associated plug-in warehouse on the slave server into the central associated plug-in warehouse on the master server 100, but also synchronize a second associated plug-in that exists in the central associated plug-in warehouse on the master server 100 but does not exist in the local associated plug-in warehouse on the slave server into the local associated plug-in warehouse on the slave server; and install, according to description information of the second associated plug-in and information about a third component that uses the second associated plug-in, the second associated plug-in onto a device on which the third component is located.

In an optional implementation manner, the device on which the second component is located is the slave server. As shown in FIG. 10, the master server 100 further includes an output device 1003. The output device 1003 may be configured to send an associated plug-in management instruction generated by the processor 1002 to the slave server, so that the slave server installs the first associated plug-in onto the device on which the second component is located. Specifically, the processor 1002 determines, according to the information about the second component, that the device on which the second component is located is the slave server, determines the first associated plug-in according to the description information of the first associated plug-in, and then sends the associated plug-in management instruction to the slave server by using the output device 1003.

In an optional implementation manner, a part of the memory 1001 may also be used as an associated plug-in registry of the master server 100, or the memory 1001 may also store the associated plug-in registry, where the information that is about the first associated plug-in and is provided by the first component is recorded in the associated plug-in registry, so that the master server 100 performs centralized management on information about all associated plug-ins.

In an optional implementation manner, as shown in FIG. 10, the master server 100 further includes an input device 1004. Based on this, the processor 1002 obtains the information that is about the first associated plug-in and is provided by the first component; and the processor 1002 is specifically configured to send a query request to the slave server by using the output device 1003, so that the slave server obtains information about the first associated plug-in that is provided by the first component by querying the associated plug-in registry on the slave server, and returns the information about the first associated plug-in. By using the input device 1004, the processor 1002 obtains the information about the first associated plug-in, where the information is provided by the first component and returned by the slave server. The information about the first associated plug-in which is provided by the first component is obtained by the slave server by querying the associated plug-in registry, the associated plug-in registry on the slave server, and returned In an optional implementation manner, the first component is a component to be installed and needs to be installed on the master server 100. Based on this, the processor 1002 may also be configured to obtain information about the first component by using the slave server, and install the first component onto the master server 100 according to the information about the first component.

Further, the associated plug-in registry of the master server 100 may also be used to record the information about the first component, so that the master server 100 performs centralized management on information about all components.

The master server provided in this embodiment obtains, by using a slave server, description information of a first associated plug-in and information about a second component that uses the associated plug-in, where the description information of the first associated plug-in and the information about the second component are provided by a first component, so as to determine the first associated plug-in and the second component that uses the first associated plug-in, and then, based on the information about the second component and the description information of the first associated plug-in, installs the first associated plug-in onto a device on which the second component is located. According to the master server provided in this embodiment, based on that description information of the associated plug-in and the information about a component that uses the associated plug-in are obtained, an installation process of the associated plug-in may be independent of an installation process of the component that uses the associated plug-in, and unified and automated installation of the associated plug-in is implemented, so that deployment of components related to the associated plug-in is no longer dependent on each other, and decoupling during deployment of components related to an associated plug-in is implemented.

Further, the master server provided in this embodiment implements automatic management for the associated plug-ins, such as automatic installation, upgrade and deletion, and decreases problems of the associated plug-ins, such as deployment complexity and error-proneness.

Figure 11:
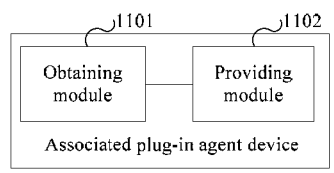
FIG. 11 is a schematic structural diagram of an associated plug-in agent device according to an embodiment of the present invention.

FIG. 11 is a schematic structural diagram of an associated plug-in agent device according to an embodiment of the present invention. As shown in FIG. 11, the device includes an obtaining module 1101 and a providing module 1102.

The obtaining module 1101 is configured to obtain information about a first associated plug-in, where the information about the first associated plug-in includes description information of the first associated plug-in and information about a second component that uses the first associated plug-in, and the first associated plug-in is provided by a first component.

The providing module 1102 is connected to the obtaining module 1101, and is configured to provide the information about the first associated plug-in for an associated plug-in management server device, so that the associated plug-in management server device installs, according to the information about the second component and the description information of the first associated plug-in, the first associated plug-in onto a device on which the second component is located.

It is hereby specified that the first component involved in this embodiment may be a component to be installed, an installed component, or a component that does not need to be installed currently, which is not limited herein.

It is hereby specified that, the device on which the second component is located may be the associated plug-in management server device, may be the associated plug-in agent device, or may be another device that is different from the associated plug-in management server device and the associated plug-in agent device. The embodiment of the present invention focuses on a situation in which the device on which the second component is located is the associated plug-in management server device or the associated plug-in agent device.

Figure 12:
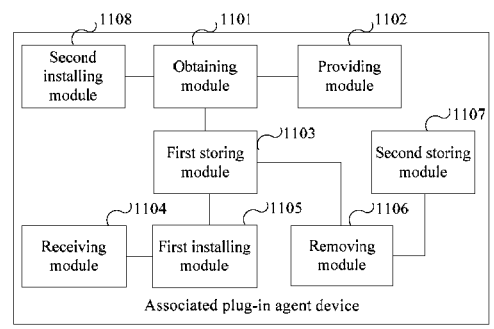
FIG. 12 is a schematic structural diagram of another associated plug-in agent device according to an embodiment of the present invention.

In an optional implementation manner, as shown in FIG. 12, the associated plug-in agent device further includes a first storing module 1103.

The first storing module 1103 may be used as a local associated plug-in warehouse on the associated plug-in agent device and used to store the first associated plug-in. Optionally, the first storing module 1103 is connected to the obtaining module 1101, and is configured to store the first associated plug-in after the obtaining module 1101 obtains the information about the first associated plug-in.

In an optional implementation manner, as shown in FIG. 12, the associated plug-in agent device further includes a receiving module 1104 and a first installing module 1105.

The receiving module 1104 is configured to receive an associated plug-in management instruction sent by the associated plug-in management server device, where the associated plug-in management instruction is sent by the associated plug-in management server device after determining that the device on which the second component is located is the associated plug-in agent device and determining the first associated plug-in according to the description information of the first associated plug-in, and is used to instruct the associated plug-in agent device to install the first associated plug-in onto the associated plug-in agent device.

The first installing module 1105 is connected to the receiving module 1104, and is configured to determine the first associated plug-in according to an instruction of the associated plug-in management instruction received by the receiving module 1104, and install the determined first associated plug-in onto the associated plug-in agent device. The first installing module 1105 is connected to the first storing module 1103, and is configured to obtain the first associated plug-in from the first storing module 1103.

Optionally, the first storing module 1103 may be further configured to store an upgrade package of the first associated plug-in, so that the associated plug-in management server device upgrades, according to the stored upgrade package that is corresponding to the first associated plug-in, the first associated plug-in when the first associated plug-in on the device on which the second component is located needs to be upgraded. Specifically, the associated plug-in management server device obtains the upgrade package of the first associated plug-in from the first storing module 1103 when the first associated plug-in on the device on which the second component is located needs to be upgraded, and then upgrades the first associated plug-in according to the upgrade package of the first associated plug-in.

In an optional implementation manner, as shown in FIG. 12, the associated plug-in agent device further includes a removing module 1106 and a second storing module 1107.

The removing module 1106 is configured to: after the first associated plug-in is deleted from the device on which the second component is located and under control of the associated plug-in management server device, move the first associated plug-in from the first storing module 1103 into the second storing module 1107 on the associated plug-in agent device.

The second storing module 1107 may be used as a local associated plug-in recycling warehouse on the associated plug-in agent device and used to store the first associated plug-in moved from the first storing module 1103.

In an optional implementation manner, the first component is a component to be installed, and needs to be installed on the associated plug-in management server device. Based on this, the obtaining module 1101 is further configured to obtain information about the first component. Correspondingly, the providing module 1102 is further configured to provide the information about the first component for the associated plug-in management server device, so that the associated plug-in management server device installs the first component onto the associated plug-in management server device according to the information about the first component.

In an optional implementation manner, the first component is a component to be installed, and needs to be installed on the associated plug-in agent device. Based on this, the obtaining module 1101 is further configured to obtain information about the first component. As shown in FIG. 12, the device further includes a second installing module 1108. The second installing module 1108 is configured to install the first component onto the associated plug-in agent device according to the information that is about the first component and is obtained by the obtaining module 1101.

Functional modules of the associated plug-in agent device provided in this embodiment may be used to perform a procedure in a method embodiment shown in FIG. 2, and detailed working principles of the functional modules are not repeated herein. For details, reference may be made to the description of the method embodiment.

The associated plug-in agent device provided in this embodiment cooperates with the associated plug-in management server device provided in the foregoing embodiment, and the description information of the first associated plug-in and the information about the second component that uses the first associated plug-in, which are provided by the first component, are provided for the associated plug-in management server device. Therefore, the associated plug-in management server device can install, according to the description information of the first associated plug-in and the information about the second component that uses the first associated plug-in, the first associated plug-in onto the device on which the second component is located, an installation process of the associated plug-in is independent of an installation process of a component that uses the associated plug-in, unified and automated installation of the associated plug-in is implemented, deployment of components related to the associated plug-in is no longer dependent on each other, and decoupling during deployment of components related to an associated plug-in is implemented.

Figure 13:
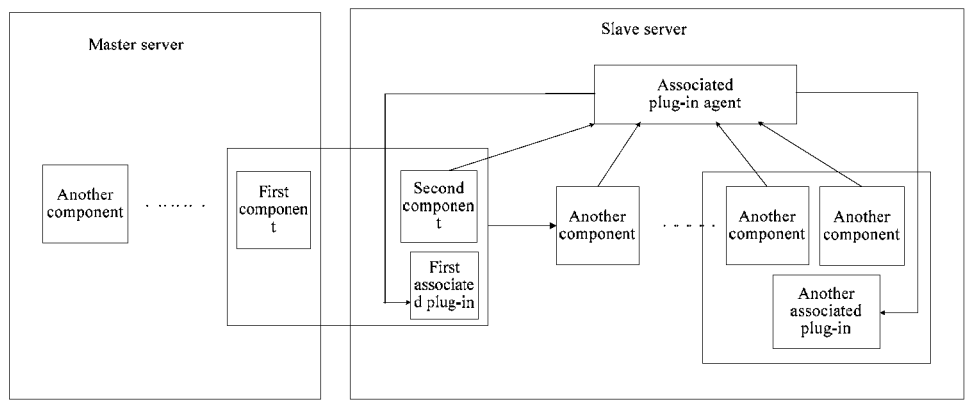
FIG. 13 is a schematic structural diagram of a slave server according to an embodiment of the present invention.

FIG. 13 is a schematic structural diagram of a slave server according to an embodiment of the present invention. The slave server is communicatively connected to a master server, at least one component is deployed on each of the slave server and the master server, a first component and a second component are included in all components deployed on the slave server and the master server, and a first associated plug-in exists between the first component and the second component. It is hereby specified that, that a first component and a second component are included in all components deployed on the slave server and the master server herein includes the following situations: the first component is deployed on the master server, and the second component is deployed on the slave server; or the first component is deployed on the slave server, and the second component is deployed on the master server; or both the first component and the second component are deployed on the master server; or both the first component and the second component are deployed on the slave server. For ease of illustration, in FIG. 13, that the first component and the second component are located on the master server and the slave server respectively is used as an example, and components other than the first component and the second component are shown as other components, and associated plug-ins other than the first associated plug-in are shown as other associated plug-ins. As shown in FIG. 13, the slave server further includes an associated plug-in agent, where the associated plug-in agent may be an associated plug-in agent device provided in the embodiment shown in FIG. 11 or FIG. 12. An implementation structure and a working principle of the associated plug-in agent device are not repeated herein. For details, reference may be made to the description in the foregoing embodiments.

The slave server provided in this embodiment cooperates with the master server provided in the foregoing embodiment, and the description information of the first associated plug-in and the information about the second component that uses the first associated plug-in, which are provided by the first component, are provided for the master server. Therefore, the master server can install, according to the description information of the first associated plug-in and the information about the second component that uses the first associated plug-in, the first associated plug-in onto the device on which the second component is located, an installation process of the associated plug-in is independent of an installation process of a component that uses the associated plug-in, unified and automated installation of the associated plug-in is implemented, deployment of components related to the associated plug-in is no longer dependent on each other, and decoupling during deployment of components related to an associated plug-in is implemented.

Figure 14:
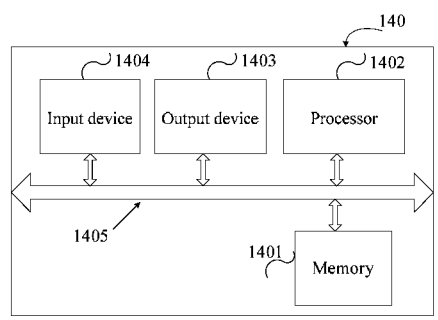
FIG. 14 is a schematic structural diagram of another slave server according to an embodiment of the present invention.

FIG. 14 is a schematic structural diagram of another slave server according to an embodiment of the present invention. The slave server is communicatively connected to a master server, at least one component is deployed on each of the slave server and the master server, a first component and a second component are included in all components deployed on the slave server and the master server, and a first associated plug-in exists between the first component and the second component. It is hereby specified that, that a first component and a second component are included in all components deployed on the slave server and the master server includes the following situations: the first component is deployed on the master server, and the second component is deployed on the slave server; or the first component is deployed on the slave server, and the second component is deployed on the master server; or both the first component and the second component are deployed on the master server; or both the first component and the second component are deployed on the slave server. As shown in FIG. 14, the slave server 140 further includes a memory 1401, a processor 1402, and an output device 1403.

The memory 1401 may include a read-only memory and a random access memory, and provide an instruction and data for the processor 1402. A part of the memory 1401 may further include a non-volatile random access memory (NVRAM).

The memory 1401 stores the following elements, an executable module or a data structure, or a subset thereof, or an extended set thereof:

operation instructions, including various operation instructions and configured to implement various operations; and an operating system, including various system programs, and configured to implement various basic services and handle hardware-based tasks.

In the embodiment of the present invention, the processor 1402 performs the following operations by invoking an operation instruction stored in the memory 1401 (the operation instruction may be stored in an operating system):

obtaining information about a first associated plug-in, where the information about the first associated plug-in is provided by a first component and includes description information of the first associated plug-in and information about a second component that uses the first associated plug-in.

The output device 1403 is configured to provide the master server with the information that is about the first associated plug-in and is obtained by the processor 1402, so that the master server installs, according to the information about the second component and the description information of the first associated plug-in, the first associated plug-in onto a device on which the second component is located.

It is hereby specified that the first component involved in this embodiment may be a component to be installed, an installed component, or a component that does not need to be installed currently, which is not limited herein.

It is hereby specified that, the device on which the second component is located may be the master server, may be the slave server 140, or may be another device that is different from the master server and the slave server 140. The embodiment of the present invention focuses on a situation in which the device on which the second component is located is the master server or the slave server 140.

In this embodiment, the processor 1402 obtains the information that is about the first associated plug-in and is provided by the first component, and provides the information for the master server by using the output device 1403. Therefore, the master server installs, according to the description information of the first associated plug-in and the information about the second component that uses the first associated plug-in, the first associated plug-in onto the device on which the second component is located, so that an installation process of the associated plug-in is independent of an installation process of a component that uses the associated plug-in, unified and automated installation of the associated plug-in is implemented, deployment of components related to the associated plug-in is no longer dependent on each other, and decoupling during deployment of components related to an associated plug-in is implemented.

The processor 1402 may also be called a CPU. The memory 1401 may include a read-only memory and a random access memory, and provide an instruction and data for the processor 1402. A part of the memory 1401 may further include a non-volatile random access memory (NVRAM). In a specific application, all components of the slave server 140 are coupled together by using a bus system 1405, where the bus system 1405 includes a power bus, a control bus, a state signal bus, and the like in addition to a data bus. However, for clear description, all buses in the diagram are denoted by the bus system 1405.

The method disclosed in the embodiment shown in FIG. 2, FIG. 3, or FIG. 5 may be applicable to the processor 1402, or may be implemented by the processor 1402. The processor 1402 may be an integrated circuit chip capable of processing signals. In an implementation process, the steps of the method may be complete by an integrated logical circuit of hardware in the processor 1402 or by means of an instruction in a form of software. The processor 1402 may be a universal processor, a digital signal processor (DSP), an application-specific integrated circuit (ASIC), a field programmable gate array (FPGA) or another programmable logical device, a discrete gate or a transistor logical device, or a discrete hardware assembly. The universal processor may be a microprocessor or the processor may also be any conventional processor, or the like. The steps of the method disclosed in the embodiment shown in FIG. 2, FIG. 3, or FIG. 5 in the present invention may be directly performed by a hardware decoding processor or performed by a combination of hardware and software modules in the decoding processor. The software modules may be located in a mature storage medium in the art, such as a random access memory, a flash memory, a read-only memory, a programmable read-only memory or an electrically erasable programmable memory, or a register. The storage medium is located in the memory 1401, and the processor 1402 reads information in the memory 1401, and completes the steps of the method in combination with hardware of the processor 1402.

Optionally, a part of the memory 1401 may be used as a local associated plug-in warehouse on the slave server 140 and used to store the first associated plug-in.

In an optional implementation manner, as shown in FIG. 14, the slave server 140 further includes an input device 1404.

The input device 1404 is configured to receive an associated plug-in management instruction sent by the master server, where the associated plug-in management instruction is sent by the master server after determining that the device on which the second component is located is the slave server 140 and determining the first associated plug-in according to the description information of the first associated plug-in, and is used to instruct the slave server 140 to install the first associated plug-in onto the slave server 140.

The processor 1402 is further configured to determine, according to an instruction of the associated plug-in management instruction received by the input device 1404, the device on which the second component is located, determine the first associated plug-in, and install the determined first associated plug-in onto the slave server 140.

Optionally, a part of the memory 1401, which is used as a local associated plug-in warehouse on the slave server, may also store an upgrade package of the first associated plug-in. Therefore, the master server upgrades, according to the stored upgrade package that is corresponding to the first associated plug-in, the first associated plug-in when the first associated plug-in on the device on which the second component is located needs to be upgraded. Specifically, the master server obtains the upgrade package of the first associated plug-in from the memory 1401 when the first associated plug-in on the device on which the second component is located needs to be upgraded, and then upgrades the first associated plug-in according to the upgrade package of the first associated plug-in.

Optionally, a part of the memory 1401 may also be used as a local associated plug-in recycling warehouse on the slave server 140 and used to store a deleted associated plug-in. Based on this, the processor 1402 may move, under control of the master server after the first associated plug-in is deleted from the device on which the second component is located, the first associated plug-in from the part used as the local associated plug-in warehouse in the memory 1401 into the part used as the local associated plug-in recycling warehouse in the memory 1401.

In an optional implementation manner, the first component is a component to be installed, and needs to be installed on the master server. Based on this, the processor 1402 is further configured to obtain information about the first component, and provide the information about the first component for the master server by using the output device 1403, so that the master server installs the first component onto the master server according to the information about the first component.

In an optional implementation manner, the first component is a component to be installed, and needs to be installed on the slave server 140. Based on this, the processor 1402 is further configured to obtain the information about the first component, and install the first component onto the slave server 140 according to the obtained information about the first component.

The slave server provided in this embodiment cooperates with the master server provided in the foregoing embodiment, and the description information of the first associated plug-in and the information about the second component that uses the first associated plug-in, which are provided by the first component, are provided for the master server. Therefore, the master server can install, according to the description information of the first associated plug-in and the information about the second component that uses the first associated plug-in, the first associated plug-in onto the device on which the second component is located, an installation process of the associated plug-in is independent of an installation process of a component that uses the associated plug-in, unified and automated installation of the associated plug-in is implemented, deployment of components related to the associated plug-in is no longer dependent on each other, and decoupling during deployment of components related to an associated plug-in is implemented.

Figure 15:
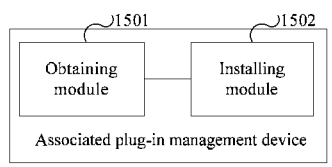
FIG. 15 is a schematic structural diagram of an associated plug-in management device according to an embodiment of the present invention.

FIG. 15 is a schematic structural diagram of an associated plug-in management device according to an embodiment of the present invention. As shown in FIG. 15, the device includes an obtaining module 1501 and an installing module 1502.

The obtaining module 1501 is configured to obtain information about a first associated plug-in by using a registration interface provided locally, where the first associated plug-in is provided by a first component, and the information about the first associated plug-in is provided when the first component is registered by using the registration interface, and includes description information of the first associated plug-in and information about a second component that uses the first associated plug-in.

The installing module 1502 is connected to the obtaining module 1501, and is configured to: after it is determined, according to the information that is about the second component and is obtained by the obtaining module 1501, that installation of the second component is complete, install, according to the information about the second component and the description information of the first associated plug-in that are obtained by the obtaining module 1501, the first associated plug-in onto a device on which the second component is located, where the first component and the second component are installed on the same device.

It is hereby specified that the associated plug-in management device in this embodiment is the device on which the first component and the second component are located, that is, both the first component and the second component are installed on the associated plug-in management device.

It is hereby specified that the first component involved in this embodiment may be a component to be installed, an installed component, or a component that does not need to be installed currently, but needs to be installed onto the associated plug-in management device ultimately.

Figure 16:
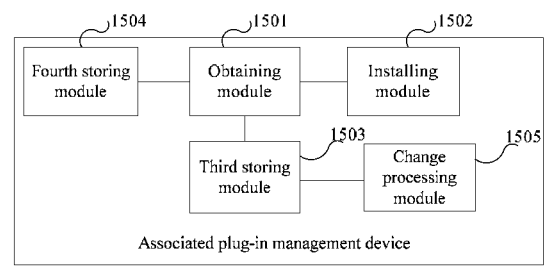
FIG. 16 is a schematic structural diagram of another associated plug-in management device according to an embodiment of the present invention.

In an optional implementation manner, as shown in FIG. 16, the associated plug-in management device further includes a third storing module 1503 and a fourth storing module 1504.

The third storing module 1503 may be used as an associated plug-in warehouse on the associated plug-in management device, and is configured to store the first associated plug-in, so that the associated plug-in management device performs centralized management on all associated plug-ins. Optionally, the third obtaining module 1503 is connected to the obtaining module 1501, and is configured to store the first associated plug-in after the obtaining module 1501 obtains the information about the first associated plug-in.

The fourth storing module 1504 is configured to store an associated plug-in registry, where the information that is about the first associated plug-in and is provided by the first component is recorded in the associated plug-in registry, so that the associated plug-in management device performs centralized management on information about all the associated plug-ins. The fourth storing module 1504 is connected to the obtaining module 1501.

Based on the foregoing description, the installing module 1502 is specifically configured to poll the third storing module 1503, and when it is discovered that the first associated plug-in is added to the third storing module 1503, install, according to the information about the second component and the description information of the first associated plug-in, the first associated plug-in onto the device on which the second component is located.

Further, optionally, as shown in FIG. 16, the associated plug-in management device further includes a change processing module 1505.

The change processing module 1505 is configured to perform change processing on the first associated plug-in according to the information about the second component and change information of the first associated plug-in when the first associated plug-in changes, where the change processing for the first associated plug-in includes performing upgrading on the first associated plug-in on the device on which the second component is located or deleting the first associated plug-in on the device on which the second component is located.

Optionally, if the change processing for the first associated plug-in is performing upgrading on the first associated plug-in on the device on which the second component is located, the change processing module 1505 is further configured to output the change information of the first associated plug-in, where the change information of the first associated plug-in includes an upgrade package that is corresponding to the first associated plug-in. Correspondingly, the third storing module 1503 is further configured to store the change information of the first associated plug-in, where the change information includes the upgrade package that is corresponding to the first associated plug-in. The first storing module 1503 is connected to the change processing module 1505, and is configured to store the change information of the first associated plug-in, where the change information is output by the change processing module 1505 and includes the upgrade package that is corresponding to the first associated plug-in.

In an optional implementation manner, the first component is a component to be installed, and needs to be installed on the associated plug-in management device. Therefore, the obtaining module 1501 is further configured to obtain information about the first component by using the registration interface, where the information about the first component is provided when the first component is registered by using the registration interface. Correspondingly, the installing module 1502 is further configured to install, according to the information that is about the first component and is obtained by the obtaining module 1501, the first component onto the device on which the second component is located.

Functional modules of the associated plug-in management device provided in this embodiment may be used to perform a procedure in a method embodiment shown in FIG. 6, and detailed working principles of the functional modules are not repeated herein. For details, reference may be made to the description of the method embodiment.

According to an associated plug-in management device provided in this embodiment, description information of a first associated plug-in and information about a second component that uses the first associated plug-in are obtained by using a registration interface, where the description information of first associated plug-in and the information about the second component are provided by a first component and provided when the first component is registered, so as to determine the first associated plug-in and the second component that uses the first associated plug-in; and then, based on the information about the second component and the description information of the first associated plug-in, the first associated plug-in is installed onto a device on which the second component is located. According to the associated plug-in management device in this embodiment, based on the obtaining description information of the associated plug-in and the information about a component that uses the associated plug-in, an installation process of the associated plug-in may be independent of an installation process of the component that uses the associated plug-in, and unified and automated installation of the associated plug-in is implemented, so that deployment of components related to the associated plug-in is no longer dependent on each other, and decoupling during deployment of components related to an associated plug-in is implemented.

Figure 17:
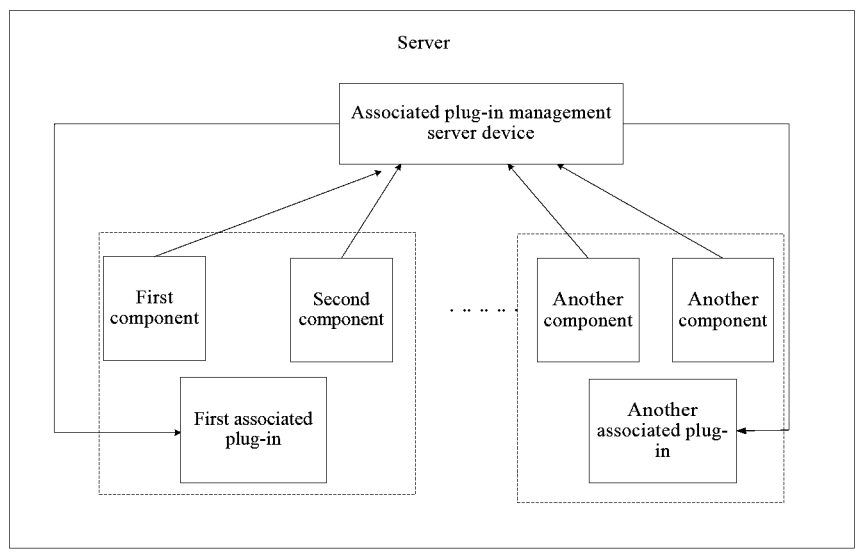
FIG. 17 is a schematic structural diagram of a server according to an embodiment of the present invention.

FIG. 17 is a schematic structural diagram of a server according to an embodiment of the present invention. At least two components are deployed on the server, where the at least two components include a first component and a second component, and a first associated plug-in exists between the first component and the second component. For ease of illustration, in FIG. 17, components other than the first component and the second component are shown as other components, and associated plug-ins other than the first associated plug-in are shown as other associated plug-ins. As shown in FIG. 17, the server further includes an associated plug-in manager, where the associated plug-in manager may be an associated plug-in management device provided in the embodiment shown in FIG. 15 or FIG. 16. For an implementation structure and a working principle of the associated plug-in management device, reference may be made to the description in the foregoing embodiments, which is not further described herein.

According to the server provided in this embodiment, description information of a first associated plug-in and information about a second component that uses the first associated plug-in are obtained by using a registration interface, where the description information of the first associated plug-in and the information about the second component are provided by a first component and provided when the first component is registered, so as to determine the first associated plug-in and the second component that uses the first associated plug-in; and then, based on the information about the second component and the description information of the first associated plug-in, the first associated plug-in is installed onto a device on which the second component is located. According to the server in this embodiment, based on the obtaining description information of the associated plug-in and the information about a component that uses the associated plug-in, an installation process of the associated plug-in may be independent of an installation process of the component that uses the associated plug-in, and unified and automated installation of the associated plug-in is implemented, so that deployment of components related to the associated plug-in is no longer dependent on each other, and decoupling during deployment of components related to an associated plug-in is implemented.

Figure 18:
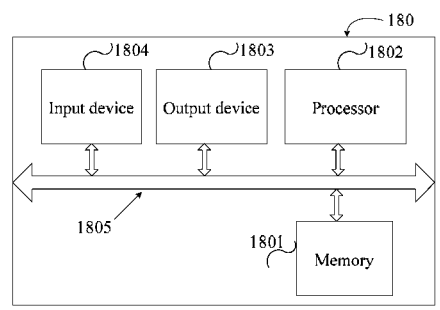
FIG. 18 is a schematic structural diagram of another server according to an embodiment of the present invention.

FIG. 18 is a schematic structural diagram of another server according to an embodiment of the present invention. At least two components are deployed on the server, where the at least two components include a first component and a second component, and a first associated plug-in exists between the first component and the second component. As shown in FIG. 18, the server 180 further includes a memory 1801 and a processor 1802.

The memory 1801 may include a read-only memory and a random access memory, and provide an instruction and data for the processor 1802. A part of the memory 1801 may further include a non-volatile random access memory (NVRAM).

The memory 1801 stores the following elements, an executable module or a data structure, or a subset thereof, or an extended set thereof:

operation instructions, including various operation instructions and configured to implement various operations; and an operating system, including various system programs, and configured to implement various basic services and handle hardware-based tasks.

In the embodiment of the present invention, the processor 1802 performs the following operations by invoking an operation instruction stored in the memory 1801 (the operation instruction may be stored in an operating system):

obtaining information about a first associated plug-in by using a registration interface provided locally, where the first associated plug-in is provided by a first component, and the information about the first associated plug-in is provided when the first component is registered by using the registration interface, and includes description information of the first associated plug-in and information about a second component that uses the first associated plug-in; and after it is determined, according to the information about the second component, that installation of the second component is complete, installing, according to the information about the second component and the description information of the first associated plug-in, the first associated plug-in onto a device on which the second component is located, where the first component and the second component are installed on the same device.

It is hereby specified that the server 180 in this embodiment is the device on which the first component and the second component are located, that is, both the first component and the second component are installed on the server 180.

It is hereby specified that the first component involved in this embodiment may be a component to be installed, an installed component, or a component that does not need to be installed currently, but needs to be installed onto the server 180 ultimately, which is not limited herein.

In this embodiment, the registration interface is provided. The processor 1802 obtains, by using the registration interface, the description information of the first associated plug-in and the information about the second component that uses the first associated plug-in, where the description information of the first associated plug-in and the information about the second component are provided by the first component and provided when the first component is registered, so as to determine the first associated plug-in and the second component that uses the first associated plug-in; and then, based on the information about the second component and the description information of the first associated plug-in, the processor installs the first associated plug-in onto the device on which the second component is located. Therefore, an installation process of the associated plug-in may be independent of an installation process of a component that uses the associated plug-in, and unified and automated installation of the associated plug-in is implemented, so that deployment of components related to the associated plug-in is no longer dependent on each other, and decoupling during deployment of components related to an associated plug-in is implemented.

The processor 1802 may also be called a CPU. The memory 1801 may include a read-only memory and a random access memory, and provide an instruction and data for the processor 1802. A part of the memory 1801 may further include a non-volatile random access memory (NVRAM). In a specific application, components of the server 180 are coupled together by using a bus system 1805, where the bus system 1805 includes a power bus, a control bus, a state signal bus, and the like in addition to a data bus. However, for clear description, buses in the diagram are all denoted by the bus system 1805.

The method disclosed in the embodiment shown in FIG. 6 may be applied to the processor 1802, or may be implemented by the processor 1802. The processor 1802 may be an integrated circuit chip capable of processing signals. In an implementation process, the steps of the method may be complete by using an integrated logical circuit of hardware or by means of an instruction in a form of software in the processor 1802. The processor 1802 may be a universal processor, a digital signal processor (DSP), an application-specific integrated circuit (ASIC), a field programmable gate array (FPGA) or another programmable logical device, a discrete gate or a transistor logical device, or a discrete hardware assembly. The universal processor may be a microprocessor or the processor may also be any conventional processor, or the like. The steps of the method disclosed in the embodiment shown in FIG. 6 in the present invention may be directly performed by a hardware decoding processor or performed by a combination of hardware and software modules in the decoding processor. The software modules may be located in a mature storage medium in the art, such as a random access memory, a flash memory, a read-only memory, a programmable read-only memory or an electrically erasable programmable memory, or a register. The storage medium is located in the memory 1801, and the processor 1802 reads information in the memory 1801, and completes the steps of the method in combination with hardware of the processor 1802.

Optionally, a part of the memory 1801 may be used as an associated plug-in warehouse on the server 180 and used to store the first associated plug-in, so that the server 180 performs centralized management on all associated plug-ins.

Optionally, the memory 1801 may further store an associated plug-in registry, where the information that is about the first associated plug-in and is provided by the first component is recorded in the associated plug-in registry, so that the server 180 performs centralized management on information about all the associated plug-ins.

Optionally, in the installing, according to the information about the second component and the description information of the first associated plug-in, the first associated plug-in onto a device on which the second component is located, the processor 1802 is specifically configured to poll a part used as an associated plug-in warehouse in the memory 1801, and when it is discovered that the first associated plug-in is added to the memory 1801, install, according to the information about the second component and the description information of the first associated plug-in, the first associated plug-in onto the device on which the second component is located.

Optionally, the processor 1802 is further configured to perform change processing on the first associated plug-in according to the information about the second component and change information of the first associated plug-in when the first associated plug-in changes, where the change processing for the first associated plug-in includes performing upgrading on the first associated plug-in on the device on which the second component is located or deleting the first associated plug-in on the device on which the second component is located.

Optionally, if the change processing for the first associated plug-in is performing upgrading on the first associated plug-in on the device on which the second component is located, the processor 1802 is further configured to output the change information of the first associated plug-in, where the change information of the first associated plug-in includes an upgrade package that is corresponding to the first associated plug-in. Correspondingly, the part used as the associated plug-in warehouse in the memory 1801 is further configured to store the change information of the first associated plug-in, where the change information includes the upgrade package that is corresponding to the first associated plug-in.

Further, as shown in FIG. 18, the server 180 further includes an output device 1803 and an input device 1804, which are responsible for completing communication between the server 180 and another device.

In an optional implementation manner, the first component is a component to be installed, and needs to be installed on the server 180. Accordingly, the processor 1802 is further configured to obtain information about the first component by using the registration interface, where the information about the first component is provided when the first component is registered by using the registration interface, and install, according to the obtained information about the first component, the first component onto the server 180 (that is, the device on which the second component is located).

The server provided in this embodiment obtains, by using a registration interface, description information of a first associated plug-in and information about a second component that uses the first associated plug-in, where the description information of the first associated plug-in and the information about the second component are provided by a first component and provided when the first component is registered, so as to determine the first associated plug-in and the second component that uses the first associated plug-in; and then, based on the information about the second component and the description information of the first associated plug-in, installs the first associated plug-in onto a device on which the second component is located. According to the server in this embodiment, based on the obtaining description information of the associated plug-in and the information about a component that uses the associated plug-in, an installation process of the associated plug-in may be independent of an installation process of the component that uses the associated plug-in, and unified and automated installation of the associated plug-in is implemented, so that deployment of components related to the associated plug-in is no longer dependent on each other, and decoupling during deployment of components related to an associated plug-in is implemented.

Figure 19:
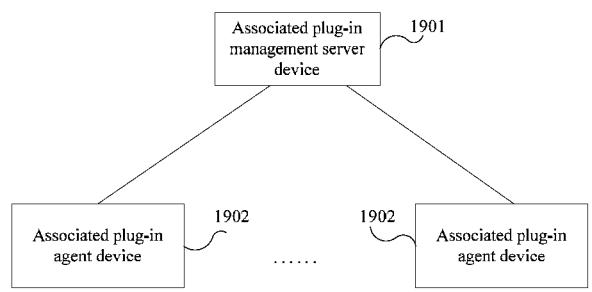
FIG. 19 is a schematic structural diagram of an associated plug-in management system according to an embodiment of the present invention.

FIG. 19 is a schematic structural diagram of an associated plug-in management system according to an embodiment of the present invention. As shown in FIG. 19, the system includes an associated plug-in management server device 1901 and at least one associated plug-in agent device 1902.

The associated plug-in management server device 1901 is configured to obtain information about a first associated plug-in by using the associated plug-in agent device 1902, where the information about the first associated plug-in includes description information of the first associated plug-in and information about a second component that uses the first associated plug-in, and the first associated plug-in is provided by a first component; and after it is determined, according to the information about the second component, that installation of the second component is complete, install, according to the information about the second component and the description information of the first associated plug-in, the first associated plug-in onto a device on which the second component is located.

The associated plug-in agent device 1902 is configured to obtain the information that is about the first associated plug-in and is provided by the first component, and provide the associated plug-in management server device 1901 with the information that is about the first associated plug-in and is provided by the first component.

It is hereby specified that the first component involved in this embodiment may be a component to be installed, an installed component, or a component that does not need to be installed currently, which is not limited herein.

It is hereby specified that, the device on which the second component is located may be the associated plug-in management server device 1901, may be the associated plug-in agent device 1902, or may be another device that is different from the associated plug-in management server device 1901 and the associated plug-in agent device 1902. The embodiment of the present invention focuses on a situation in which the device on which the second component is located is the associated plug-in management server device 1901 or the associated plug-in agent device 1902.

In an optional implementation manner, the associated plug-in agent device 1902 is further configured to store the first associated plug-in into a local associated plug-in warehouse on the associated plug-in agent device 1902; and the associated plug-in management server device 1901 is further configured to perform synchronization on a central associated plug-in warehouse on the associated plug-in management server device 1901 and the local associated plug-in warehouse on the associated plug-in agent device 1902, so as to synchronize the first associated plug-in into the central associated plug-in warehouse on the associated plug-in management server device 1901.

In an optional implementation manner, the associated plug-in management server device 1901 is specifically configured to poll the central associated plug-in warehouse on the associated plug-in management server device 1901, and when it is discovered that the first associated plug-in is added to the central associated plug-in warehouse on the associated plug-in management server device 1901, install, according to the information about the second component and the description information of the first associated plug-in, the first associated plug-in onto the device on which the second component is located.

In an optional implementation manner, the associated plug-in management server device 1901 is further configured to perform change processing on the first associated plug-in according to the information about the second component and change information of the first associated plug-in when the first associated plug-in changes, where the change processing for the first associated plug-in includes performing upgrading on the first associated plug-in on the device on which the second component is located or deleting the first associated plug-in on the device on which the second component is located.

If the change processing for the first associated plug-in is performing upgrading on the first associated plug-in on the device on which the second component is located, the change information of the first associated plug-in includes an upgrade package that is corresponding to the first associated plug-in.

In an optional implementation manner, the upgrade package that is corresponding to the first associated plug-in is installed on the associated plug-in management server device 1901. Therefore, the associated plug-in management server device 1901 may upgrade the first associated plug-in directly according to the upgrade package that is corresponding to the first associated plug-in. Based on this, the associated plug-in management server device 1901 is further configured to store the change information of the first associated plug-in into the central associated plug-in warehouse on the associated plug-in management server device 1901 after performing upgrading on the first associated plug-in, where the change information includes the upgrade package that is corresponding to the first associated plug-in.

In an optional implementation manner, the upgrade package that is corresponding to the first associated plug-in is installed on the associated plug-in agent device. The associated plug-in agent device 1902 is further configured to: store the upgrade package that is corresponding to the first associated plug-in into the local associated plug-in warehouse on the associated plug-in agent device 1902 before the associated plug-in management server device 1901 upgrades the first associated plug-in; and correspondingly, the associated plug-in management server device 1901 is further configured to synchronize the upgrade package that is corresponding to the first associated plug-in from the local associated plug-in warehouse on the associated plug-in agent device 1902 into the central associated plug-in warehouse on the associated plug-in management server device 1901 before upgrading the first associated plug-in.

In an optional implementation manner, the associated plug-in management server device 1901 is further configured to: if the change processing for the first associated plug-in is the deleting the first associated plug-in from the device on which the second component is located, after deleting the first associated plug-in from the device on which the second component is located, move the first associated plug-in from the central associated plug-in warehouse on the associated plug-in management server device 1901 into a central associated plug-in recycling warehouse on the associated plug-in management server device 1901, and control the associated plug-in agent device 1902 to move the first associated plug-in from the local associated plug-in warehouse on the associated plug-in agent device 1902 into a local associated plug-in recycling warehouse on the associated plug-in agent device 1902.

In an optional implementation manner, the associated plug-in agent device 1902 is further configured to obtain information about the first component, and provide the information about the first component for the associated plug-in agent device 1902. Correspondingly, the associated plug-in agent device 1902 is further configured to install the first component onto the associated plug-in management server device 1901 according to the information about the first component.

In an optional implementation manner, the associated plug-in agent device 1902 is further configured to obtain the information about the first component, and install the first component onto the associated plug-in agent device 1902 according to the information about the first component.

It is hereby specified that the associated plug-in management server device 1901 in this embodiment may be an associated plug-in management server device in the embodiment shown in FIG. 7 or FIG. 8. For its specific implementation structure, reference may be made to FIG. 7 or FIG. 8, which is not further described herein. The associated plug-in agent device 1902 in this embodiment may be an associated plug-in agent device in the embodiment shown in FIG. 11 or FIG. 12. For its specific implementation structure, reference may be made to FIG. 11 or FIG. 12, which is not further described herein.

It is hereby specified that the associated plug-in management system provided in this embodiment may manage associated plug-ins between components that are deployed in a distributed manner in a same application system, or manage associated plug-ins between components that are deployed in a distributed manner in different application systems. The application system may be an alarm system, a network topology system, or a security subsystem, or the like.

In the associated plug-in management system provided in this embodiment, an associated plug-in management server device and an associated plug-in agent device are used to implement unified and automated management and distribution for associated plug-ins, and therefore, deployment of components related to the associated plug-in is no longer dependent on each other, and decoupling during deployment of components related to an associated plug-in is implemented.

Figure 20:
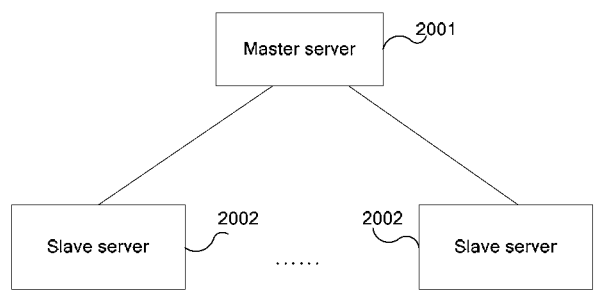
FIG. 20 is a schematic structural diagram of a distributed system according to an embodiment of the present invention.

FIG. 20 is a schematic structural diagram of a distributed system according to an embodiment of the present invention. As shown in FIG. 20, the system includes a master server 2001 and at least one slave server 2002, where at least one component is deployed on each of the master server 2001 and the slave server 2002, a first component and a second component are included in all components deployed on the master server 2001 and the slave server 2002, and a first associated plug-in exists between the first component and the second component. It is hereby specified that, that a first component and a second component are included in all components deployed on the master server 2001 and the slave server 2002 includes the following situations: the first component is deployed on the master server 2001, and the second component is deployed on the slave server 2002; or the first component is deployed on the slave server 2002, and the second component is deployed on the master server 2001; or both the first component and the second component are deployed on the master server 2001; or both the first component and the second component are deployed on the slave server 2002, where:

the master server 2001 further includes an associated plug-in management server, where the associated plug-in management server may be an associated plug-in management server device provided in the embodiment shown in FIG. 7 or FIG. 8. An implementation structure and a working principle of the associated plug-in management server device are not repeated herein. For details, reference may be made to the description in the foregoing embodiments.

The slave server 2002 further includes an associated plug-in agent, where the associated plug-in agent may be an associated plug-in agent device provided in the embodiment shown in FIG. 11 or FIG. 12. An implementation structure and a working principle of the associated plug-in agent device are not repeated herein. For details, reference may be made to the description in the foregoing embodiments.

It is hereby specified that the distributed system provided in this embodiment may be formed by components that are deployed in a distributed manner in a same application system, or may be formed by components that are deployed in a distributed manner in different application systems. The application system may be an alarm system, a network topology system, or a security subsystem, or the like.

In the distributed system provided in this embodiment, an associated plug-in management server and an associated plug-in agent are used to implement unified and automated management and distribution for associated plug-ins, and therefore, deployment of components related to the associated plug-in is no longer dependent on each other, and decoupling during deployment of components related to an associated plug-in is implemented.

Figure 21:
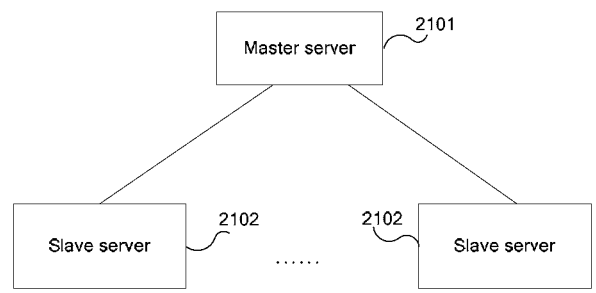
FIG. 21 is a schematic structural diagram of another distributed system according to an embodiment of the present invention.

FIG. 21 is a schematic structural diagram of another distributed system according to an embodiment of the present invention. As shown in FIG. 21, the system includes a master server 2101 and at least one slave server 2102, where at least one component is deployed on each of the master server 2101 and the slave server 2102, a first component and a second component are included in all components deployed on the master server 2101 and the slave server 2102, and a first associated plug-in exists between the first component and the second component. It is hereby specified that, that a first component and a second component are included in all components deployed on the master server 2101 and the slave server 2102 includes the following situations: the first component is deployed on the master server 2101, and the second component is deployed on the slave server 2102; or the first component is deployed on the slave server 2102, and the second component is deployed on the master server 2101; or both the first component and the second component are deployed on the master server 2101; or both the first component and the second component are deployed on the slave server 2102, where:

the master server 2101 may be a master server provided in the embodiment shown in FIG. 10. An implementation structure and a working principle of the master server 2101 are not repeated herein. For details, reference may be made to the description in the foregoing embodiment.

The slave server 2102 may be a slave server provided in the embodiment shown in FIG. 14. An implementation structure and a working principle of the slave server 2102 are not repeated herein. For details, reference may be made to the description in the foregoing embodiment.

It is hereby specified that the distributed system provided in this embodiment may be formed by components that are deployed in a distributed manner in a same application system, or may be formed by components that are deployed in a distributed manner in different application systems. The application system may be an alarm system, a network topology system, or a security subsystem, or the like.

In the distributed system provided in this embodiment, a master server and a slave server are used to implement unified and automated management and distribution for associated plug-ins, and therefore, deployment of components related to the associated plug-in is no longer dependent on each other, and decoupling during deployment of components related to an associated plug-in is implemented.

Persons of ordinary skill in the art may understand that all or a part of the steps of the method embodiments may be implemented by instructing relevant hardware (such as a processor) by a program. The foregoing program may be stored in a computer readable storage medium. When the program runs, the steps of the foregoing method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An associated plug-in management method, comprising:
obtaining, by an associated plug-in management server device, information about a first associated plug-in by using an associated plug-in agent device, wherein the information about the first associated plug-in comprises description information of the first associated plug-in and information about a second component that uses the first associated plug-in, and the first associated plug-in is provided by a first component; and
after determining, according to the information about the second component, that installation of the second component is complete, installing, by the associated plug-in management server device according to the information about the second component and the description information of the first associated plug-in, the first associated plug-in onto a device on which the second component is located;
wherein the first associated plug-in exists between the first component and the second component, and the first associated plug-in is a module that is developed by the first component through an extended interface defined by the second component;
wherein the first component exchanges data with the second component by using the first associated plug-in.

2. The method according to claim 1, wherein the first associated plug-in is stored in a local associated plug-in warehouse on the associated plug-in agent device; and
the method further comprises:
performing, by the associated plug-in management server device, synchronization on a central associated plug-in warehouse on the associated plug-in management server device and the local associated plug-in warehouse on the associated plug-in agent device, so that the first associated plug-in is synchronized into the central associated plug-in warehouse on the associated plug-in management server device.

3. The method according to claim 2, wherein the installing, by the associated plug-in management server device according to the information about the second component and the description information of the first associated plug-in, the first associated plug-in onto a device on which the second component is located comprises:
polling, by the associated plug-in management server device, the central associated plug-in warehouse on the associated plug-in management server device, and when it is discovered that the first associated plug-in is added into the central associated plug-in warehouse on the associated plug-in management server device, installing, according to the information about the second component and the description information of the first associated plug-in, the first associated plug-in onto the device on which the second component is located.

4. The method according to claim 3, further comprising:
performing, by the associated plug-in management server device, change processing on the first associated plug-in according to the information about the second component and change information of the first associated plug-in when the first associated plug-in changes, wherein the change processing for the first associated plug-in comprises performing upgrading on the first associated plug-in on the device on which the second component is located or deleting the first associated plug-in on the device on which the second component is located.

5. The method according to claim 4, wherein, if the change processing for the first associated plug-in is performing upgrading on the first associated plug-in on the device on which the second component is located, the change information of the first associated plug-in comprises an upgrade package that is corresponding to the first associated plug-in.

6. The method according to claim 5, wherein the method further comprises:
storing, by the associated plug-in management server device, the change information of the first associated plug-in into the central associated plug-in warehouse on the associated plug-in management server device after performing upgrading on the first associated plug-in, wherein the change information comprises the upgrade package that is corresponding to the first associated plug-in.

7. The method according to claim 5, wherein the method further comprises:
synchronizing, by the associated plug-in management server device, the upgrade package that is corresponding to the first associated plug-in from the local associated plug-in warehouse on the associated plug-in agent device into the central associated plug-in warehouse on the associated plug-in management server device before performing upgrading on the first associated plug-in.

8. The method according to claim 4, wherein, if the change processing for the first associated plug-in is deleting the first associated plug-in from the device on which the second component is located, after the first associated plug-in is deleted from the device on which the second component is located, the method further comprises:
moving, by the associated plug-in management server device, the first associated plug-in from the central associated plug-in warehouse on the associated plug-in management server device into a central associated plug-in recycling warehouse on the associated plug-in management server device, and controlling the associated plugin agent device to move the first associated plug-in from the local associated plug-in warehouse on the associated plug-in agent device into a local associated plug-in recycling warehouse on the associated plug-in agent device.

9. The method according to claim 2, further comprising:
synchronizing, by the associated plug-in management server device, a second associated plug-in into the local associated plug-in warehouse on the associated plug-in agent device, wherein the second associated plug-in exists in the central associated plug-in warehouse on the associated plug-in management server device but does not exist in the local associated plug-in warehouse on the associated plug-in agent device; and installing, by the associated plug-in management server device according to description information of the second associated plug-in and information about a third component that uses the second associated plug-in, the second associated plug-in onto a device on which the third component is located.

10. The method according to claim 1, wherein the device on which the second component is located is the associated plug-in agent device; and
the installing, by the associated plug-in management server device according to the information about the second component and the description information of the first associated plug-in, the first associated plug-in onto a device on which the second component is located, comprises:
determining, by the associated plug-in management server device according to the information about the second component, that the device on which the second component is located is the associated plug-in agent device, determining the first associated plug-in according to the description information of the first associated plug-in, and sending an associated plug-in management instruction to the associated plug-in agent device to instruct the associated plug-in agent device to install the first associated plug-in onto the associated plug-in agent device.

11. The method according to claim 1, wherein, after the obtaining, by an associated plug-in management server device, information about a first associated plug-in by using an associated plug-in agent device, wherein the first associated plug-in is provided by a first component, the method further comprises:
storing, by the associated plug-in management server device, the information about the first associated plug-in into an associated plug-in registry of the associated plug-in management server device, so as to perform centralized management on information about all associated plug-ins.

12. The method according to claim 1, wherein the obtaining, by an associated plug-in management server device, information about a first associated plug-in by using an associated plug-in agent device, wherein the first associated plug-in is provided by a first component, comprises:
sending, by the associated plug-in management server device, a query request to the associated plug-in agent device, so that the associated plug-in agent device obtains information about the first associated plug-in that is provided by the first component by querying the associated plug-in registry on the associated plug-in agent device, and returns the information about the first associated plug-in agent; and
receiving, by the associated plug-in management server device, the information about the first associated plug-in, wherein the information about the first associated plug-in is returned by the associated plug-in agent device, and the first associated plug-in is provided by the first component.

13. The method according to claim 1, further comprising:
obtaining, by the associated plug-in management server device, information about the first component by using the associated plug-in agent device, and installing the first component onto the associated plug-in management server device according to the information about the first component.

14. A distributed system, comprising a master server and at least one slave server, wherein at least one component is deployed on each of the master server and the slave server, a first component and a second component are comprised in all components deployed on the master server and the slave server, and a first associated plug-in exists between the first component and the second component, and the first associated plug-in is a module that is developed by the first component through an extended interface defined by the second component; wherein the master server comprises: a first memory and a first processor coupled to the first memory, and the slave server comprises: a second memory and a second processor coupled to the second memory,
the master server is configured to obtain information about a first associated plug-in by using the slave server, wherein the information about the first associated plug-in comprises description information of the first associated plug-in and information about a second component that uses the first associated plug-in, and the first associated plug-in is provided by a first component; and after it is determined, according to the information about the second component, that installation of the second component is complete, install, according to the information about the second component and the description information of the first associated plug-in, the first associated plug-in onto a device on which the second component is located;
the slave server is configured to obtain the information of the first associated plug-in that is provided by the first component, and provide the information about the first associated plug-in for the master server; and
wherein the master server serves as an associated plug-in management server device, and the slave server serves as an associated plug-in agent device;
wherein the first component exchanges data with the second component by using the first associated plug-in.

15. The system according to claim 14, wherein the slave server is further configured to store the first associated plug-in into a local associated plug-in warehouse on the slave server; and
the master server is further configured to perform synchronization on a central associated plug-in warehouse on master server and the local associated plug-in warehouse on the slave server, so that the first associated plug-in is synchronized into the central associated plug-in warehouse on the master server.

16. The system according to claim 15, wherein the master server is specifically configured to poll the central associated plug-in warehouse on the master server, and when it is discovered that the first associated plug-in is added to the central associated plug-in warehouse on the master server, install, according to the information about the second component and the description information of the first associated plug-in, the first associated plug-in onto the device on which the second component is located.

17. A master server, wherein the master server is communicatively connected to at least one slave server, at least one component is deployed on each of the master server and the slave server, a first component and a second component are comprised in all components deployed on the master server and the slave server, and a first associated plug-in exists between the first component and the second component, and the first associated plug-in is a module that is developed by the first component through an extended interface defined by the second component; and the master server further comprises: a memory and a processor coupled to the memory and configured to:
   obtain information about a first associated plug-in by using an associated plug-in agent device, wherein the information about the first associated plug-in comprises description information of the first associated plug-in and information about a second component that uses the first associated plug-in, and the first associated plug-in is provided by a first component; and
   after determining, according to the information about the second component, that installation of the second component is complete, install, according to the information about the second component and the description information of the first associated plug-in, the first associated plug-in onto a device on which the second component is located;
   wherein the master server serves as an associated plug-in management server;
   wherein the first component exchanges data with the second component by using the first associated plug-in.

18. The master server according to claim 17, wherein the processor is further configured to:
   when the first associated plug-in is stored in a local associated plug-in warehouse on the slave server, perform synchronization on a central associated plug-in warehouse on the master server and the local associated plug-in warehouse on the slave server, so that the first associated plug-in is synchronized into the central associated plug-in warehouse on the master server.

19. The master server according to claim 18, wherein the processor is further configured to: poll the central associated plug-in warehouse on the master server, and when it is discovered that the first associated plug-in is added to the central associated plug-in warehouse on the master server, install, according to the information about the second component and the description information of the first associated plug-in, the first associated plug-in onto the device on which the second component is located.

20. The master server according to claim 19, wherein the processor is further configured to: perform change processing on the first associated plug-in according to the information about the second component and change information of the first associated plug-in when the first associated plug-in changes, wherein the change processing for the first associated plug-in comprises performing upgrading on the first associated plug-in on the device on which the second component is located or deleting the first associated plug-in on the device on which the second component is located.

21. The master server according to claim 20, wherein, when the change processing for the first associated plug-in is performing upgrading on the first associated plug-in on the device on which the second component is located, wherein the processor is further configured to: output the change information of the first associated plug-in, wherein the change information of the first associated plug-in comprises an upgrade package that is corresponding to the first associated plug-in.

22. The master server according to claim 21, wherein the processor is further configured to: store the change information of the first associated plug-in into the central associated plug-in warehouse on the master server after performing upgrading on the first associated plug-in, wherein the change information comprises the upgrade package that is corresponding to the first associated plug-in.

23. The master server according to claim 21, wherein the processor is further configured to: synchronize the upgrade package that is corresponding to the first associated plug-in from the local associated plug-in warehouse on the slave server into the central associated plug-in warehouse on the master server before upgrading is performed on the first associated plug-in.

24. The master server according to claim 20, wherein the processor is further configured to: when the change processing for the first associated plug-in is deleting the first associated plug-in from the device on which the second component is located, after the first associated plug-in is deleted from the device on which the second component is located, move the first associated plug-in from the central associated plug-in warehouse on the master server into a central associated plug-in recycling warehouse on the master server, and control the slave server to move the first associated plug-in from the local associated plug-in warehouse on the slave server into a local associated plug-in recycling warehouse on the slave server.

25. The master server according to claim 18, wherein the processor is further configured to: synchronize a second associated plug-in into the local associated plug-in warehouse on the slave server, wherein the second associated plug-in exists in the central associated plug-in warehouse on the master server but does not exist in the local associated plug-in warehouse on the slave server; and install, according to description information of the second associated plug-in and information about a third component that uses the second associated plug-in, the second associated plug-in onto a device on which the third component is located.

26. The master server according to claim 17, wherein the device on which the second component is located is the slave server; and
   wherein the processor is further configured to: determine, according to the information about the second component, that the device on which the second component is located is the slave server, determine the first associated plug-in according to the description information of the first associated plug-in, and send an associated plug-in management instruction to the slave server to instruct the slave server to install the first associated plug-in onto the slave server.

27. The master server according to claim 17, wherein the processor is further configured to: store an associated plug-in registry, wherein the information about the first associated plug-in is recorded in the associated plug-in registry records, so that the master server performs centralized management on information about all associated plug-ins.

28. The master server according to claim 17, wherein the processor is further configured to: send a query request to the slave server and receive the information about the first associated plug-in, wherein the information about the first associated plug-in is returned by the slave server in response to the query request, and the information about the first associated plug-in is obtained by the slave server by querying the associated plug-in registry on the slave server and is returned by the slave server, wherein the first associated plug-in is provided by the first component.

29. The master server according to claim 17, wherein the processor is further configured to: obtain information about the first component by using the slave server; and install the first component onto the master server according to the information about the first component.

\* \* \* \* \*